(12) United States Patent
Suga et al.

(10) Patent No.: US 10,189,440 B2
(45) Date of Patent: Jan. 29, 2019

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Yuji Suga, Aichi-ken (JP); Shinichi Okubo, Aichi-ken (JP)

(73) Assignee: KABUSHIKI KAISHA TOKAI-RIKA-DENKI-SEISAKUSHO, Aichi-ken (JP)

(*) Notice: Subject to any disclaimer, the term of this patent is extended or adjusted under 35 U.S.C. 154(b) by 198 days.

(21) Appl. No.: 15/340,642

(22) Filed: Nov. 1, 2016

(65) Prior Publication Data

US 2017/0129453 A1 May 11, 2017

(30) Foreign Application Priority Data

Nov. 5, 2015 (JP) ................. 2015-217712

(51) Int. Cl.
*B60R 22/36* (2006.01)
*B60R 22/34* (2006.01)
*B60R 22/28* (2006.01)

(52) U.S. Cl.
CPC .......... *B60R 22/36* (2013.01); *B60R 22/3413* (2013.01); *B60R 2022/286* (2013.01)

(58) Field of Classification Search
CPC ................ B60R 22/36; B60R 22/3413; B60R 2022/286
See application file for complete search history.

(56) References Cited

U.S. PATENT DOCUMENTS

2012/0175451 A1* 7/2012 Yanagawa ........... B60R 22/3413
242/379.1
2016/0046260 A1* 2/2016 Nakamura .......... B60R 22/3413
242/379.1

FOREIGN PATENT DOCUMENTS

| JP | 2012-012001 | | 1/2012 | |
| JP | 2013084172 | * | 4/2013 | ............. B60R 22/28 |
| JP | 2015-120431 | | 7/2015 | |

* cited by examiner

*Primary Examiner* — Sang K Kim
(74) *Attorney, Agent, or Firm* — Roberts Mlotkowski Safran Cole & Calderon, P.C.

(57) ABSTRACT

A webbing take-up device includes: a spool that takes up webbing worn by an occupant and is rotated in a pull-out direction due to the webbing being pulled out; a base lock that is provided capable of rotating integrally with the spool and is restricted from rotating in the pull-out direction of the spool in vehicle emergency; a pawl that is rotated together with the spool and that, by being displaced to an engaged position, engages with a winding ring and transmits rotation force of the spool to the winding ring; and a trigger ring that is provided capable of being displaced in a rotation circumferential direction of the spool with respect to the spool and includes a pawl-abut portion, abutting the pawl and displacing the pawl to the engaged position when the spool is rotated in the pull-out direction with respect to the lock section.

12 Claims, 20 Drawing Sheets

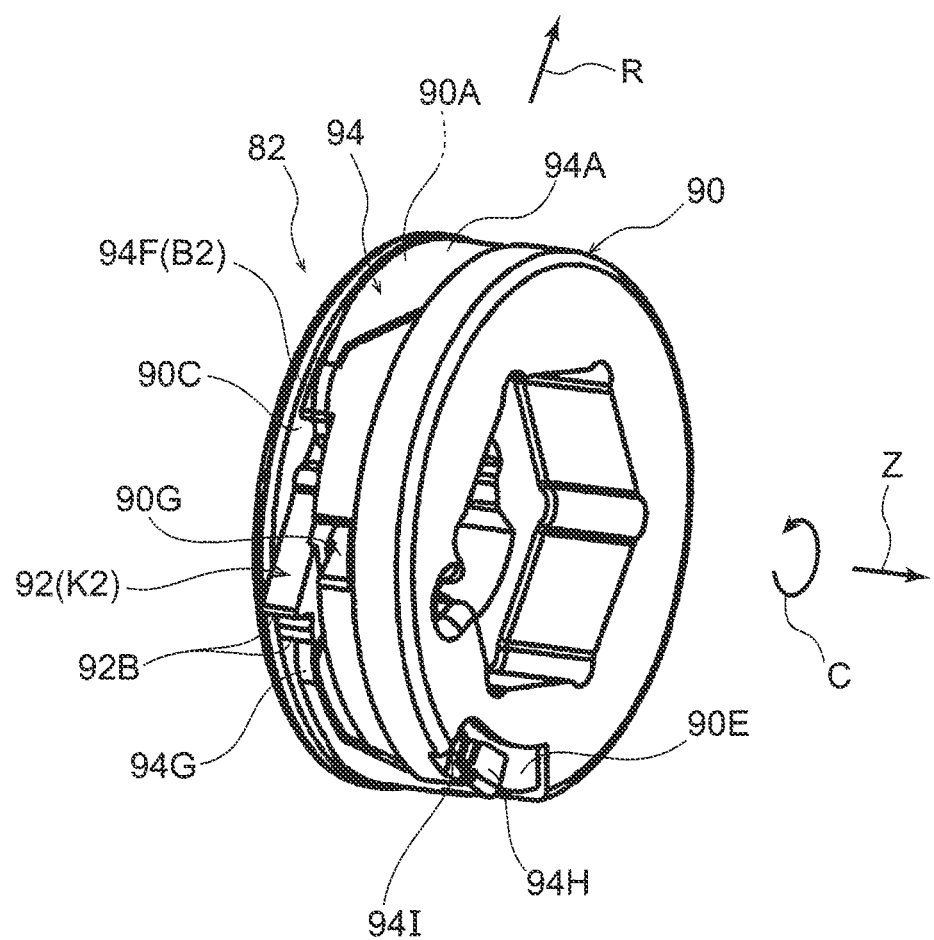

WEBBING TAKE-UP DEVICE

CROSS-REFERENCE TO RELATED APPLICATION

This application claims priority under 35 USC 119 from Japanese Patent Application No. 2015-217712 filed Nov. 5, 2015, the disclosure of which is incorporated by reference herein.

BACKGROUND

Field of the Invention

The present invention relates to a webbing take-up device.

Related Art

The webbing take-up device described in Japanese Patent Application Laid-Open (JP-A) No. 2012-12001 (Patent Document 1) includes a plate section that is supported at the spool so as to be capable of rotating relatively thereto, and a guide hole that engages with a pin formed to a second lock pawl is formed in the plate section. The second lock pawl is rotated in a pull-out direction together with the spool, such that the pin of the second lock pawl moves along the guide hole formed in the plate section, and the second lock pawl engages with a lock ring (rotation force transmitting member). Rotation force of the spool is thereby transmitted to the lock ring through the second lock pawl and so on. In the webbing take-up device described in Patent Document 1, the circular column shaped pin needs to be provided to the second lock pawl, processing to form the guide hole in which the pin is engaged needs to be performed on the plate section, and a member that covers the second lock pawl need to be provided. Moreover, the pin of the second lock pawl needs to be inserted into the guide hole of the plate section in the assembly process of the webbing take-up device, such that the assembly process becomes complex.

The webbing take-up device described in Japanese Patent Application Laid-Open (JP-A) No. 2015-120431 (Patent Document 2) includes a lock base that is restricted from rotating in a vehicle emergency, and a guide groove, in which a guide shaft of a FL pawl is engaged, is formed in the lock base. The spool is rotated in the pull-out direction with respect to the lock base, such that the guide shaft moves along the guide groove, and the FL pawl is moved toward a rotation radial direction outside of the spool and engages with a lock ring (rotation force transmitting member). Rotation force of the spool is thereby transmitted to the lock ring through the FL pawl and the like.

In the webbing take-up devices described in Patent Document 1 and Patent Document 2, rotation force of a spool is transmitted to a rotation force transmitting member when a specific condition is met such as a vehicle emergency or the like.

SUMMARY

In consideration of the above circumstances, the present invention obtains a webbing take-up device capable of transmitting rotation force of a spool to a rotation force transmitting member.

A webbing take-up device of a first aspect includes: a spool that takes up a webbing worn by an occupant, and that is rotated in a pull-out direction due to the webbing being pulled out; a lock section that is configured to rotate (provided so as to be capable of rotating) integrally with the spool, and that is restricted from rotating in the pull-out direction in a vehicle emergency so as to limit rotation of the spool in the pull-out direction, with respect to the lock section; a pawl that is rotated together with the spool and that, by being displaced to an engaged position, engages with a rotation force transmitting member so as to transmit rotation force of the spool to the rotation force transmitting member; and a pawl displacement member that is configured to be displaced (provided so as to be capable of being displaced) in a rotation circumferential direction of the spool, with respect to the spool, and that includes a pawl-abut portion, the pawl-abut portion abutting the pawl and displacing the pawl to the engaged position in a case in which the spool is rotated in the pull-out direction, with respect to the lock section.

A webbing take-up device of a second aspect is the webbing take-up device of the first aspect, wherein the pawl-abut portion is configured to deform (capable of deforming) toward a side opposite to the pawl and is configured to return (capable of returning) toward a side of the pawl from a deformed state of the pawl-abut portion.

A webbing take-up device of a third aspect is the webbing take-up device of the first aspect or the second aspect, wherein the pawl displacement member is configured including a stop portion that restricts displacement of the pawl displacement member in the rotation circumferential direction of the spool, with respect to the lock section, by being stopped at a stopping portion formed at the lock section.

A webbing take-up device of a fourth aspect is the webbing take-up device of the third aspect, wherein: the pawl displacement member is configured including a facing portion, the facing portion being restricted from moving in a rotation axis direction of the spool by being disposed between the lock section and the spool; and the stop portion extends from the facing portion.

A webbing take-up device of a fifth aspect is the webbing take-up device of the fourth aspect, wherein: the pawl displacement member is configured including an abut portion that restricts displacement of the pawl displacement member, with respect to the spool, by being abutted by an abutting portion provided at the spool in a case in which the pawl is disposed in the engaged position; and after the abut portion is abutted by the abutting portion, the stop portion comes away from the stopping portion in a case in which the spool is rotated in the pull-out direction, with respect to the lock section.

A webbing take-up device of a sixth aspect is the webbing take-up device of any one of the first aspect to the fifth aspect, wherein: the pawl displacement member is configured including a wound section that is attached to a ring shaped pawl displacement member winding section provided at the spool, the wound section being formed in a ring shape corresponding to the pawl displacement member winding section, and the wound section being formed in a plate shape with a thickness direction thereof being a rotation radial direction of the spool.

A webbing take-up device of a seventh aspect is the webbing take-up device of the sixth aspect, wherein a first end portion on a pull-out direction side of the wound section and a second end portion on an opposite side to the pull-out direction side of the wound section overlap with each other; and the second end portion is disposed further toward an outer side in the rotation radial direction of the spool than the first end portion.

A webbing take-up device of an eighth aspect is the webbing take-up device of the sixth aspect or the seventh aspect, wherein: the wound section is disposed at an inner side in the rotation radial direction of the spool, with respect to the rotation force transmitting member that has an inner peripheral portion formed in a ring shape; and a length from one side end in the rotation circumferential direction of the spool to another side end in the rotation circumferential direction of the spool of the wound section is longer than an inner peripheral length in the rotation circumferential direction of the spool of the rotation force transmitting member.

A webbing take-up device of a ninth aspect is the webbing take-up device of any one of the sixth aspect to the eighth aspect, wherein: the pawl is disposed at an inner side in the rotation radial direction of the spool, with respect to the wound section; and the pawl-abut portion extends from the wound section toward the inner side in the rotation radial direction of the spool.

In the webbing take-up device of the first aspect, the webbing is pulled out from the spool, and the webbing is worn by an occupant. In a vehicle emergency, rotation of the lock section in the pull-out direction (the spool pull-out direction) is restricted, and rotation of the spool in the pull-out direction is limited. When the occupant pulls the webbing further in the pull-out direction in a state in which rotation of the spool in the pull-out direction has been limited, the spool is rotated in the pull-out direction with respect to the lock section. The webbing is thereby permitted to be pulled out from the spool.

In the webbing take-up device of the first aspect, the pawl is abutted by the pawl-abut portion of the pawl displacement member when the spool is rotated in the pull-out direction with respect to the lock section. Due thereto, the pawl is displaced to the engaged position and engages with the rotation force transmitting member. This accordingly enables rotation force of the spool to be transmitted to the rotation force transmitting member through the pawl.

In the webbing take-up device of the second aspect, when the pawl is pressed back toward the opposite side to the engaged position in a process in which the pawl is displaced toward the engaged position side, the pawl-abut portion of the pawl displacement member is deformed toward the opposite side to the pawl. Note that the pawl-abut portion that has been deformed toward the opposite side to the pawl is configured returning toward the pawl side. This enables the pawl, which has been pressed back toward the opposite side to the engaged position, to be urged toward the engaged position side.

In the webbing take-up device of the third aspect, displacement of the pawl displacement member in the rotation circumferential direction (the spool rotation circumferential direction) with respect to the lock section is restricted by the stop portion of the pawl displacement member being stopped by the stopping portion of the lock section. This enables the pawl to be made to abut the pawl-abut portion of the pawl displacement member by rotating the spool in the pull-out direction with respect to the lock section, without separately providing a mechanism that displaces the pawl-abut portion of the pawl displacement member toward the pawl side.

In the webbing take-up device of the fourth aspect, movement of the facing portion of the pawl displacement member in the rotation axis direction (the spool rotation axis direction) is restricted by the spool and the lock section. Forming the stop portion so as to extend from the facing portion enables the stop portion of the pawl displacement member to be suppressed from unexpectedly coming away from the stopping portion of the lock section.

In the webbing take-up device of the fifth aspect, the abut portion of the pawl displacement member is abutted by the abutting portion of the spool when the spool is rotated in the pull-out direction with respect to the lock section and the pawl is disposed in the engaged position. The stop portion of the pawl displacement member comes away from the stopping portion of the lock section when the spool is rotated in the pull-out direction with respect to the lock section after the abut portion of the pawl displacement member has been abutted by the abutting portion of the spool. This enables limitation on rotation of the spool in the pull-out direction with respect to the lock section by the pawl displacement member to be suppressed. Namely, this enables pull-out load of the webbing from the spool to be suppressed from becoming unintentional load.

In the webbing take-up device of the sixth aspect, the wound section of the pawl displacement member is attached to the pawl displacement member winding section of the spool, and the wound section of the pawl displacement member is formed in a plate shape with its thickness direction being the rotation radial direction (the spool rotation radial direction). This enables the wound section of the pawl displacement member to be suppressed from projecting out toward the rotation radial direction outside with respect to the pawl displacement member winding section of the spool. This enables an increase in the size of the body of the webbing take-up device to be suppressed.

In the webbing take-up device of the seventh aspect, the second end portion is disposed further toward outside in the rotation radial direction of the spool than the first end portion. Thus, even though the wound section of the pawl displacement member has expanded in diameter when the spool is rotated in the pull-out direction, the first end portion which is on the pull-out direction side of the wound section of the pawl displacement member can be suppressed from catching on a member disposed at the radial direction outside of the wound section.

In the webbing take-up device of the eighth aspect, the wound section of the pawl displacement member is disposed on the spool rotation radial direction inside with respect to the rotation force transmitting member, further, the length (a dimension in the spool rotation circumferential direction) of the wound section of the pawl displacement member is set longer than the inner peripheral length (a dimension in the spool rotation circumferential direction) of the rotation force transmitting member. Thus, even though the wound section of the pawl displacement member has expanded in diameter when the spool is rotated in the pull-out direction, the first end portion on the pull-out direction side of the wound section of the pawl displacement member can be suppressed from catching on an inner peripheral portion of the rotation force transmitting member. This enables rotation force of the spool to be prevented from being transmitted to the rotation force transmitting member through the pawl displacement member.

In the webbing take-up device of the ninth aspect, the pawl is disposed at the rotation radial direction inside (the spool rotation radial direction inside) of the wound section of the pawl displacement member, and the pawl-abut portion abutted by the pawl is disposed at the rotation radial direction inside of the wound section. This enables the mechanism that transmits rotation force of the spool to the rotation force transmitting member to be suppressed from increasing in size in the rotation radial direction of the spool.

BRIEF DESCRIPTION OF THE DRAWINGS

Exemplary embodiments will be described in detail with reference to the following figures, wherein:

FIG. 21 is an enlarged perspective view corresponding to FIG. 20, illustrating a rotation force transmitting mechanism according to the third exemplary embodiment, and illustrating a state in which a restricting portion of a trigger ring is deformed and disposed in a permitting position and a pawl is disposed in an engaged position;

DETAILED DESCRIPTION

Figure 1:
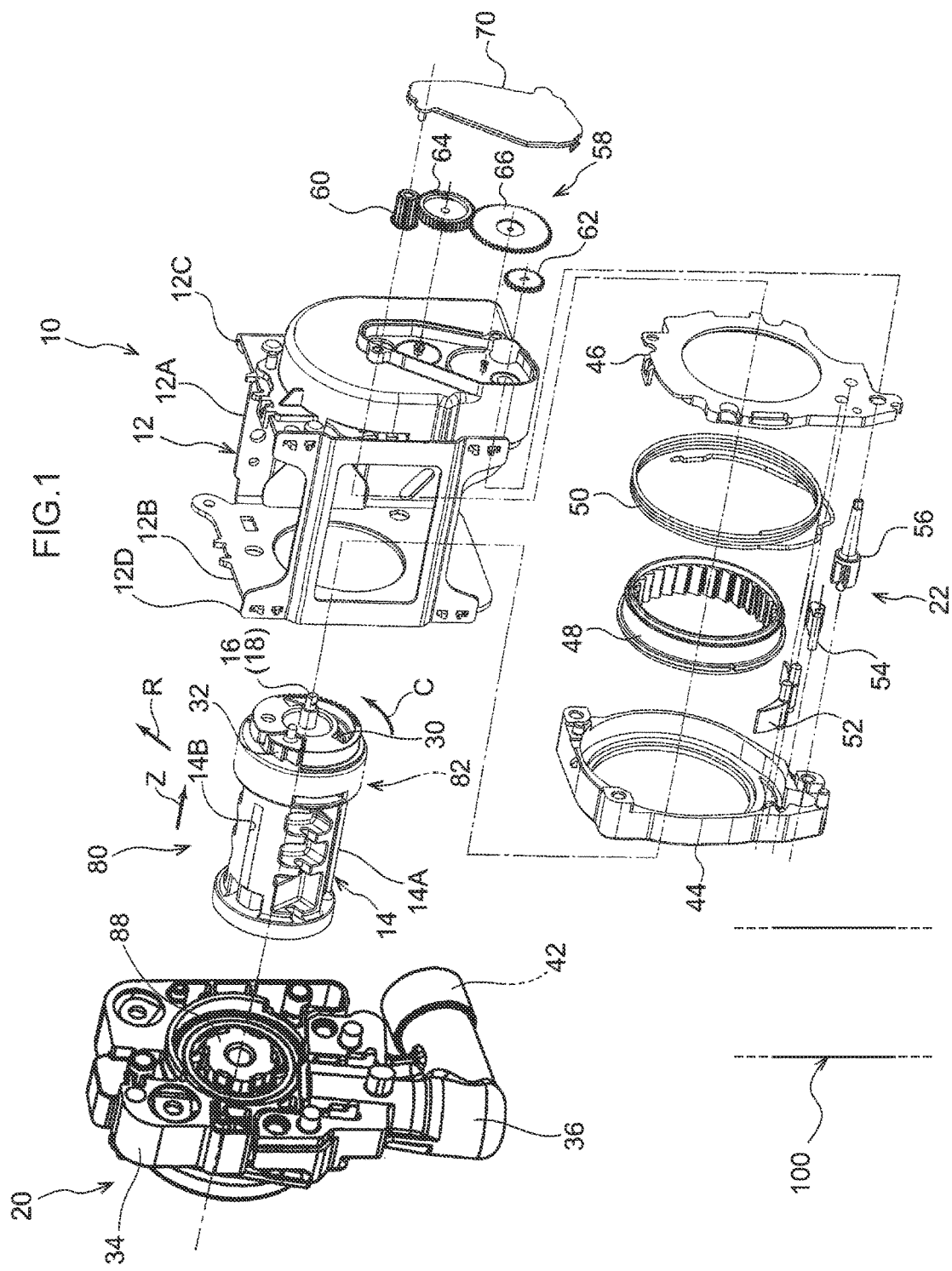
FIG. 1 is an exploded perspective view illustrating a webbing take-up device of an exemplary embodiment.

Explanation follows regarding a webbing take-up device according to an exemplary embodiment, with reference to FIG. 1 to FIG. 17. Note that the arrow Z direction, the arrow R direction, and the arrow C direction indicated in the drawings respectively indicate a rotation axis direction (axis direction of rotation), a rotation radial direction (radial direction of rotation), and a rotation circumferential direction (circumferential direction of rotation) of a spool, as appropriate. Unless specifically stated otherwise, simple reference to the axial direction, radial direction, and circumferential direction below refers to the rotation axis direction, the rotation radial direction, and the rotation circumferential direction of the spool.

Figure 2:
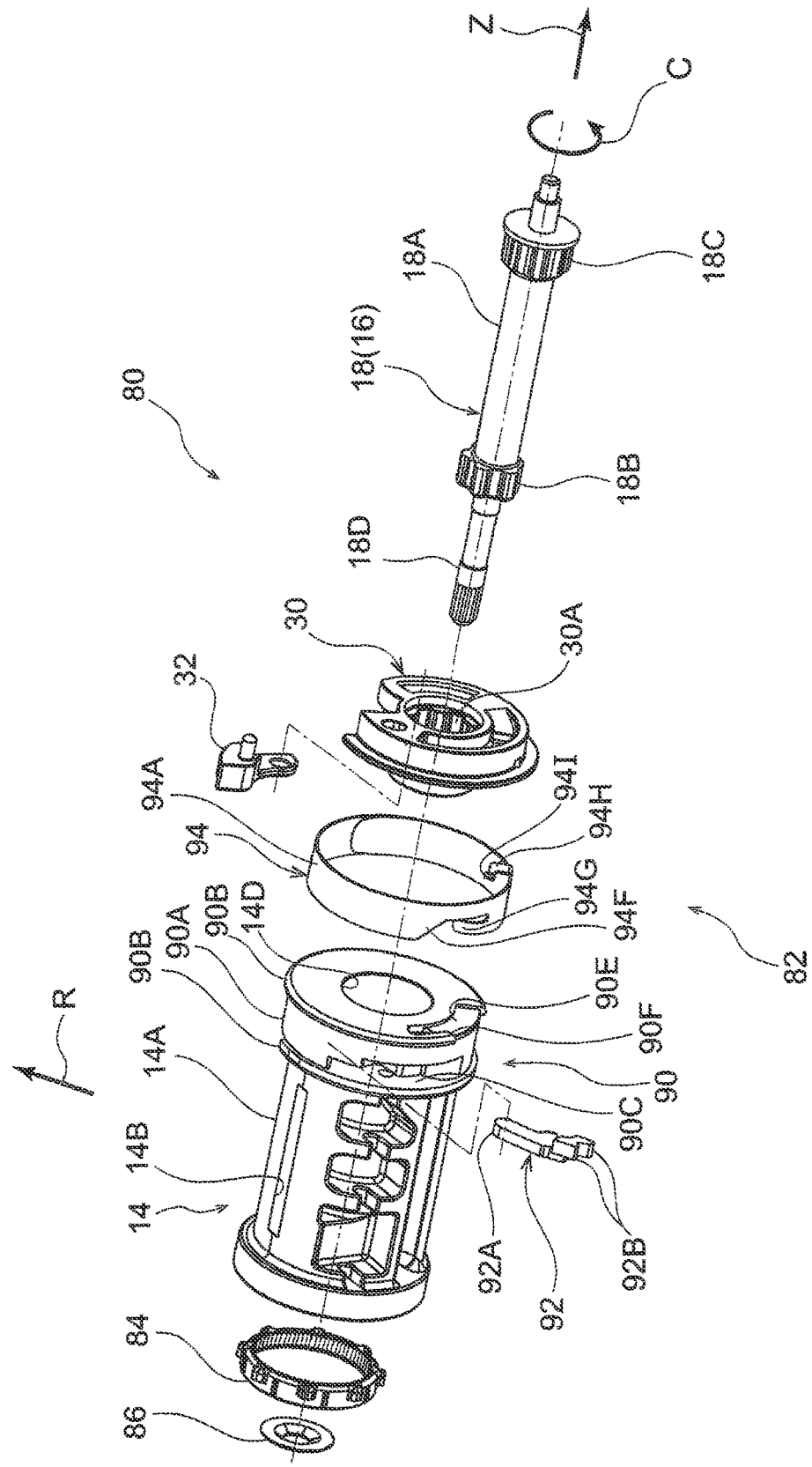
FIG. 2 is an exploded perspective view illustrating a spool assembly body.

As illustrated in FIG. 1, a webbing take-up device 10 according to an exemplary embodiment includes a frame 12, a spool 14 that takes up webbing 100, and a torsion shaft 18 configuring a first force limiter mechanism 16 (see FIG. 2 also). The webbing take-up device 10 also includes a pretensioner mechanism 20 that forcibly rotates the spool 14 in a take-up direction in a vehicle emergency, and a second force limiter mechanism 22 that includes a force limiter load generating mechanism and a force limiter load adjusting mechanism.

The frame 12 is formed in a rectangular frame shape, and includes a plate shaped back plate 12A that is fixed to the vehicle body. Leg pieces 12B, 12C extend out at substantially right angles from both width direction end portions of the back plate 12A. End portions of the leg pieces 12B, 12C at the opposite side to the back plate 12A are linked together by a connecting plate 12D.

A spool assembly body 80 is illustrated in FIG. 2. As illustrated in FIG. 2, the spool assembly body 80 includes the spool 14 on which the webbing 100 worn by an occupant is taken up. The spool assembly body 80 also includes a rotation force transmitting mechanism 82 provided to an end portion on one axial direction side of the spool 14, a base lock 30 serving as a lock section provided to the spool 14 so as to be capable of rotating integrally thereto, and the torsion shaft 18 that joins (links) the spool 14 and the base lock 30 together.

The spool 14 is formed in a substantially circular column shape and includes a take-up section 14A on which the webbing 100 is taken up. An insertion hole 14B for inserting the webbing 100 is formed in the take-up section 14A. The insertion hole 14B is formed in a rectangular shape with its length direction along the axial direction as viewed from the radial direction outside. The webbing 100 is inserted through the insertion hole 14B and a stopper member is attached to a length direction end portion of the webbing 100, thereby anchoring the length direction end portion of the webbing 100 to the spool 14. The spool 14 is rotated toward another side in the circumferential direction (the opposite direction to the arrow C direction), namely, the spool 14 is rotated in the take-up direction, to take up the webbing 100 onto the spool 14. The spool 14 is rotated toward one side in the circumferential direction (the arrow C direction), namely, the spool 14 is rotated in a pull-out direction, by pulling the webbing 100 out from the spool 14.

An end portion on another side in the axial direction (the opposite direction to the arrow Z direction) of the spool 14 configures a non-illustrated rotation force transmitting section that transmits rotation force of a pinion gear 88 (see FIG. 1) configuring part of the pre-tensioner mechanism 20, described later, through a one-way clutch 84. The one-way clutch 84 is configured so as to only transmit rotation force in the take-up direction of the pinion gear 88 to the spool 14.

A torsion shaft insertion hole 14D for inserting the torsion shaft 18, described later, is formed in an axial center portion of the spool 14. A non-illustrated first engage portion, for engaging a first serrated portion 18B formed on the torsion shaft 18, is formed on the another side in the axial direction of the torsion shaft insertion hole 14D. The first serrated portion 18B of the torsion shaft 18 engages with the first engage portion, such that the torsion shaft 18 and the spool 14 are joined together so as to be capable of rotating integrally to each other.

The base lock 30 and a lock gear 32, configuring part of a lock mechanism, are provided on the one side in the axial direction of the spool 14. The base lock 30 is formed in a substantially circular plate shape with its thickness direction along the axial direction. The lock gear 32 is supported by the base lock 30 so as to be capable of tilting (swinging). In a vehicle emergency, the base lock 30 and the lock gear 32 engage with non-illustrated ratchet teeth provided to the leg piece 12C of the frame 12 (see FIG. 1), thereby restricting rotation of the base lock 30 in the pull-out direction.

A second engage portion 30A, for engaging a second serrated portion 18C formed on the torsion shaft 18, described below, is formed in an axial center portion of the base lock 30. The second serrated portion 18C of the torsion shaft 18 engages with the second engage portion 30A, such that the torsion shaft 18 and the base lock 30 are joined together so as to be capable of rotating integrally to each other.

The torsion shaft 18 is formed in substantially a rod shape. The first serrated portion 18B and the second serrated portion 18C, which are respectively engaged by the first engaging portion provided to the spool 14 and the second engage portion 30A provided to the base lock 30, are respectively formed at an intermediate portion, and an end portion on one side, in the axial direction of the torsion shaft 18. A location of the torsion shaft 18 between the first serrated portion 18B and the second serrated portion 18C configures a twisting portion 18A that has a smaller diameter than the first serrated portion 18B and the second serrated portion 18C, and that has a substantially constant circular cross-section profile along the axial direction. When load acting on the occupant from the webbing 100 has exceeded a specific value in a state in which rotation of the spool 14 in the pull-out direction with respect to the base lock 30 has been limited through the torsion shaft 18, the twisting portion 18A of the torsion shaft 18 is twisted, and rotation of the spool 14 in the pull-out direction with respect to the base lock 30 is permitted. A location on the another side in the axial direction of the torsion shaft 18 configures an engagement shaft portion 18D that is inserted through a non-illustrated through-hole formed in the end portion on the another axial direction side of the spool 14, and that engages with a non-illustrated return spring or the like. Note that the torsion shaft 18 does not fall out of the torsion shaft insertion hole 14D formed in the spool, due to a stopper member 86 being attached to the engagement shaft portion 18D.

As illustrated in FIG. 1, the pre-tensioner mechanism 20 is configured including a cylinder 36 connected to a case 34, a non-illustrated rack disposed inside the cylinder 36, the pinion gear 88 that meshes with the moving rack, and a gas generator 42 that is attached to one end portion of the cylinder 36. The pressure inside the cylinder 36 rises due to high pressure gas generated on actuating the gas generator 42, such that the rack is moved, and the rack and the pinion gear 88 meshing with the rack is rotated in the take-up direction. The spool 14 is thereby rotated in the take-up direction.

Figure 3:
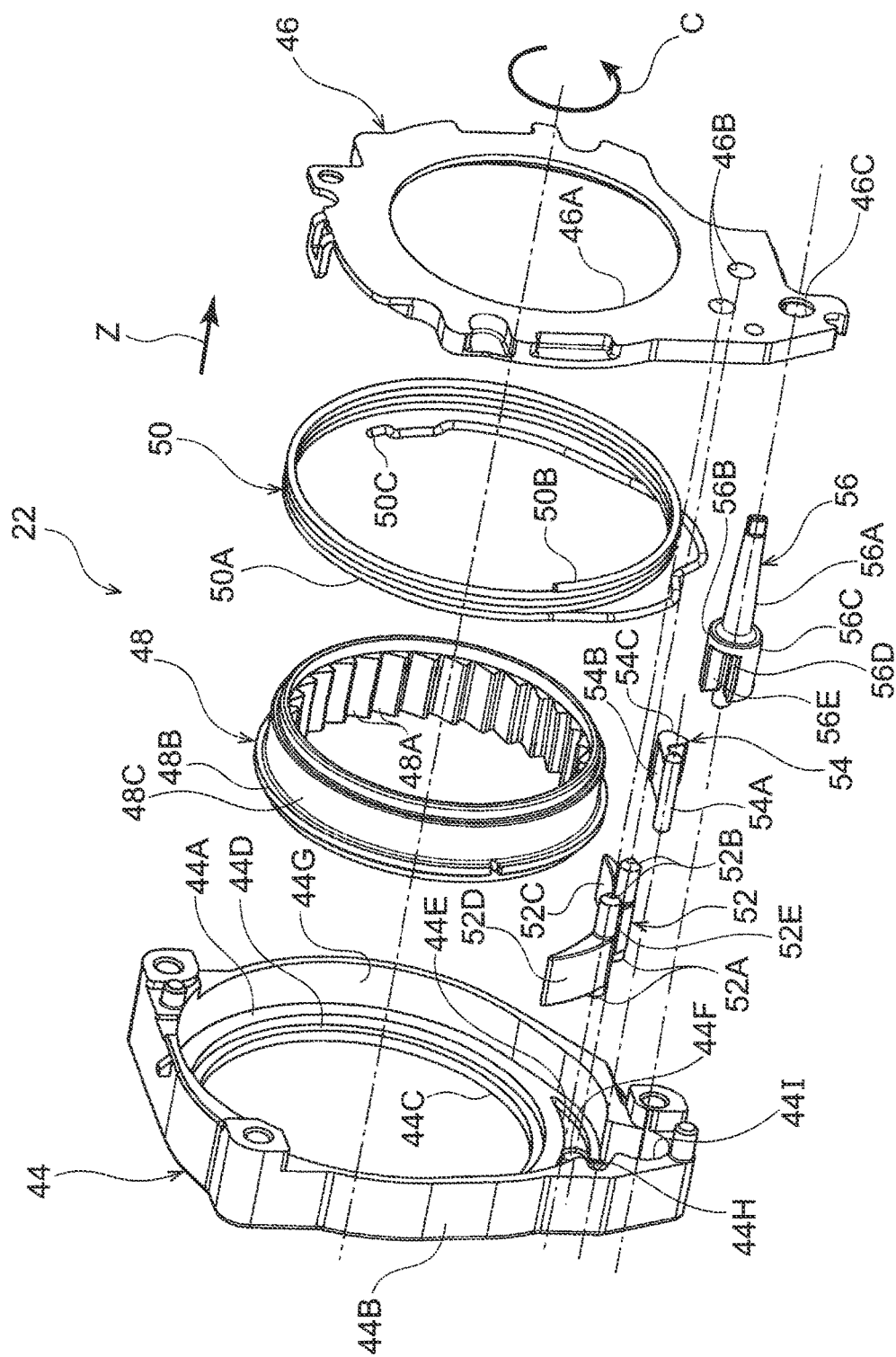
FIG. 3 is an exploded perspective view illustrating a force limiter load generating and adjusting mechanism of a webbing take-up device.

As illustrated in FIG. 3, the second force limiter mechanism 22 includes a housing 44 that is fixed to the leg piece 12C of the frame 12 (see FIG. 1), and a cover sheet 46 that is attached to an end portion on the one side in the axial direction of the housing 44. The second force limiter mechanism 22 also includes a winding ring 48, an energy absorbing wire 50, a wire guide 52, a lever 54, and a cam 56 that are disposed between the housing 44 and the cover sheet 46.

The housing 44 is formed in a box shape open toward the one side in the axial direction. The housing 44 includes a bottom wall 44A that extends so as to face the leg piece 12C of the frame 12 (see FIG. 1), and a side wall 44B that bends and extends from an outer peripheral end of the bottom wall 44A toward the one side in the axial direction. An insertion hole 44C for inserting the end portion on the one side in the axial direction of the spool 14 (see FIG. 1) is formed in the bottom wall 44A. The winding ring 48, described later, is supported so as to be capable of rotating by engaging with a stepped portion 44D formed at an inner peripheral edge portion of the insertion hole 44C. A wire guide attachment portion 44E, to which the wire guide 52, described later, is attached, is provided at the radial direction outside of a location of the bottom wall 44A where the insertion hole 44C is formed. A circular shaped support hole 44F is formed in the wire guide attachment portion 44E. A radial direction inside face of the side wall 44B is disposed facing the winding ring 48, described later, in the radial direction. Part of the radial direction inside face of the side wall 44B configures a preset face 44G formed in a circular tube faced shape. A recess shaped lever support portion 44H, which supports the lever 54, described later, so as to allow tilting (swinging), is formed in a location of the side wall 44B corresponding to the wire guide attachment portion 44E of the bottom wall 44A. A recess shaped cam placement portion 44I, in which the cam 56, described later, is disposed, is formed in a location of the side wall 44B corresponding to the wire guide attachment portion 44E of the bottom wall 44A, this also being a location adjacent to the lever support portion 44H. Note that a non-illustrated shaft support hole that supports an end portion on the another side in the axial direction of the cam 56, described later, is formed in a location of the bottom wall 44A corresponding to the cam placement portion 44I.

The cover sheet 46 is attached to an end portion on the one side in the axial direction of the side wall 44B of the housing 44. An insertion hole 46A, which corresponds to the insertion hole 44C formed in the bottom wall 44A of the housing 44, is formed in the cover sheet 46. Circular shaped support holes 46B are formed in locations of the cover sheet 46 facing the wire guide attachment portion 44E of the housing 44 in the axial direction. An insertion hole 46C, through which a shaft portion 56A of the cam 56, described later, is inserted, is formed in a location of the cover sheet 46 corresponding to the cam placement portion 44I of the housing 44.

Figure 8:
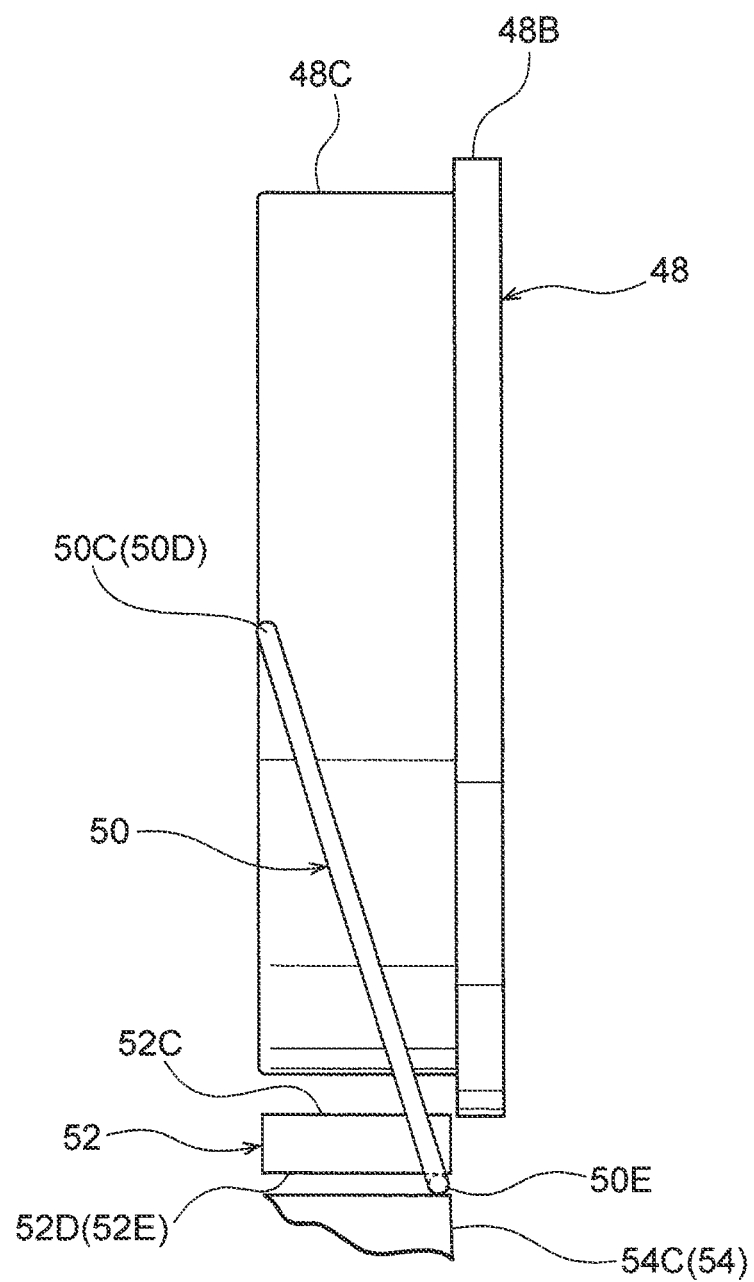
FIG. 8 is a side view schematically illustrating a state prior to an energy absorbing wire being taken up by a winding ring.
Figure 9:
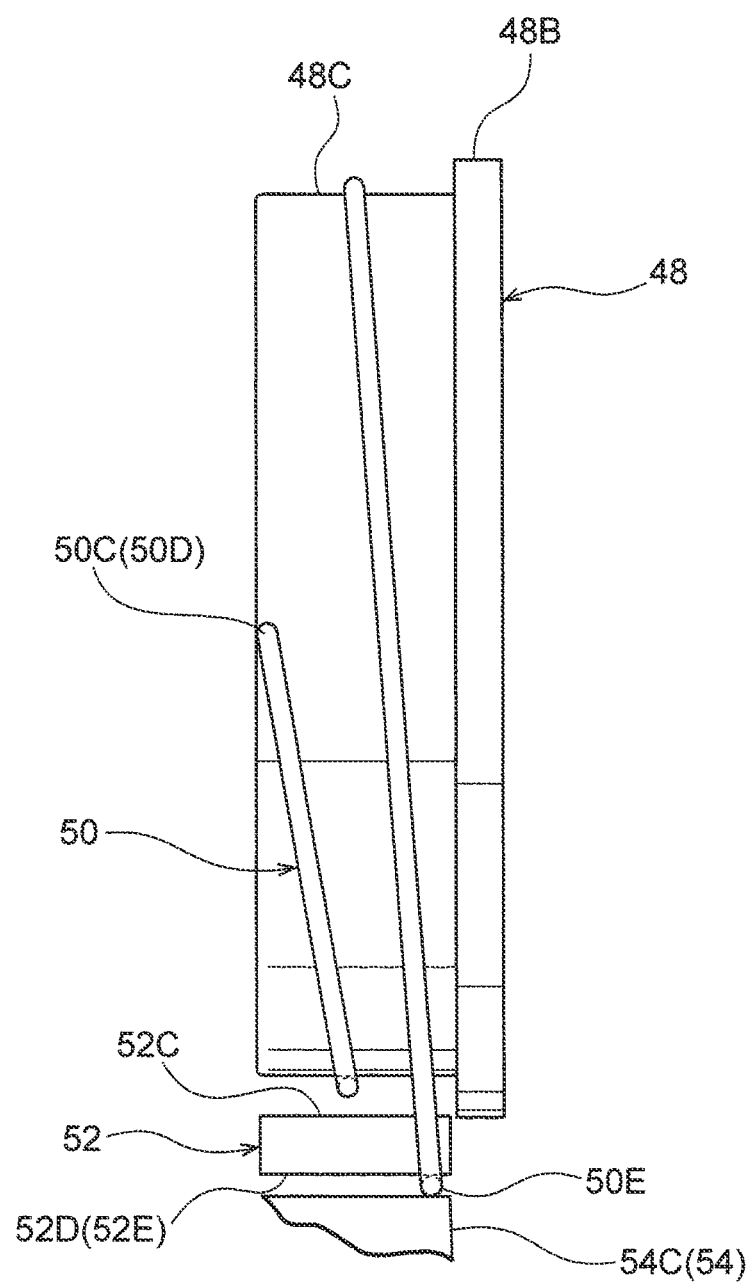
FIG. 9 is a side view schematically illustrating a state in which a winding ring is taking up an energy absorbing wire.

The winding ring 48, which serves as a rotation force transmitting member, is formed in a tube shape. The winding ring 48 is disposed coaxially to the spool 14, and at the radial direction outside of the end portion on the one side in the axial direction of the spool 14 (the location where the rotation force transmitting mechanism 82 (see FIG. 1), described later, is provided). Plural engagement tooth portions 48A that engage a pawl 92, described later, are formed around the circumferential direction on an inner peripheral portion of the winding ring 48. As illustrated in FIG. 3, FIG. 8, and FIG. 9, a flange portion 48B that projects out toward the radial direction outside is formed at an end portion on the another side in the axial direction of an outer peripheral portion of the winding ring 48. A location on the outer peripheral face of the winding ring 48, that is further toward the one side in the axial direction than the flange portion 48B, configures a take-up face 48C for taking up the energy absorbing wire 50, described below.

Figure 4:
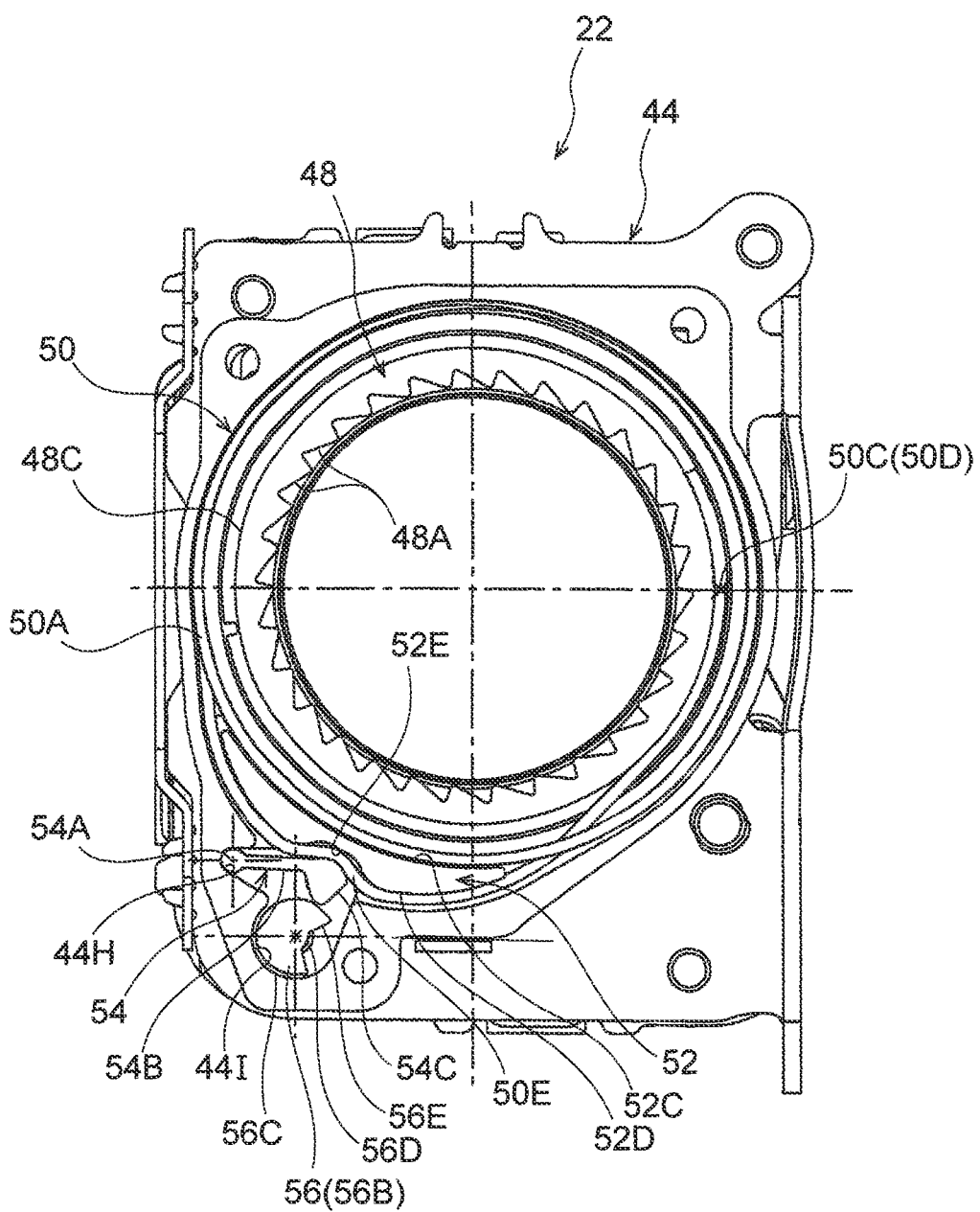
FIG. 4 is a face-on view illustrating a force limiter load generating and adjusting mechanism.

The energy absorbing wire 50 is formed by winding a linear member (a wire shaped member) formed using steel material or the like. Specifically, the energy absorbing wire 50 includes a ring shaped portion 50A formed by winding the linear member in ring shape around the circumferential direction such that ring-like portions are arranged along the axial direction. The external diameter of the ring shaped portion 50A, in a natural state, prior to being set on the preset face 44G of the housing 44 described above, is an external diameter that is larger than an inner diameter of the preset face 44G The ring shaped portion 50A is disposed at the radial direction inside of the preset face 44G in a state in which the ring shaped portion 50A has been reduced in diameter, and a radial direction outside face of the ring shaped portion 50A abuts a radial direction inside face of the preset face 44G, thereby attaching the energy absorbing wire 50 to the housing 44. An end portion 50B on the one side in the axial direction of the energy absorbing wire 50 configures part of the ring shaped portion 50A. As illustrated in FIG. 4, an end portion 50C on the another side in the axial direction of the energy absorbing wire 50 is displaced to the one side in the axial direction of the ring shaped portion 50A through the radial direction inside of the ring shaped portion 50A. The end portion 50C on the another side in the axial direction of the energy absorbing wire 50 is anchored to an end portion on the one side in the axial direction of the winding ring 48. Thus, as illustrated in FIG. 8, a location 50D of the energy absorbing wire 50 that is anchored to the winding ring 48, and a location 50E of the energy absorbing wire 50 that is sandwiched (held) between the wire guide 52, described later, and the lever 54, are disposed offset from each other in the axial direction of the winding ring 48.

As illustrated in FIG. 3 and FIG. 4, the wire guide 52 is formed using a material that has a lower strength than the energy absorbing wire 50. A radial direction outside face and a radial direction inside face of the wire guide 52 are formed in gently curved such as crescent shape as viewed from the axial direction, and the wire guide 52 is formed in a block shape with a specific thickness in the axial direction. Circular column shaped support columns 52A and 52B, which are respectively inserted into the support hole 44F formed in the housing 44 and the support holes 46B formed in the cover sheet 46, are respectively provided on the another side in the axial direction and the one side in the axial direction of the wire guide 52. The radial direction inside face of the wire guide 52 configures a set face 52C that is abutted by the ring shaped portion 50A of the energy absorbing wire 50 attached to the housing 44. In a state in which the wire guide 52 has been attached to the wire guide attachment portion 44E of the housing 44, the set face 52C is disposed along an extension (imaginary extension) of the preset face 44G Note that the curvature of the set face 52C and the curvature of the preset face 44G are set so as to be substantially the same curvature as each other. The radial direction outside face of the wire guide 52 configures a guide face 52D that guides a location between the end portion 50C on the another side in the axial direction of the energy absorbing wire 50 and a location that has been displaced from the ring shaped portion 50A of the energy absorbing wire 50. An indented portion 52E is formed in a circumferential direction intermediate portion of the guide face 52D. Plural curved portions are thereby formed on the guide face 52D.

The lever 54 is formed in a block shape including a shaft portion 54A disposed inside the lever support portion 44H formed in the housing 44, an arm portion 54B extending from the shaft portion 54A toward the wire guide 52 side, and a movement portion 54C provided at a leading end of the arm portion 54B. Specifically, the shaft portion 54A is formed in a circular column shape corresponding to the shape of an inner peripheral face of the lever support portion 44H. The shaft portion 54A is disposed inside the lever support portion 44H, thereby tilting (swinging) the arm portion 54B. Swinging the arm portion 54B moves the movement portion 54C provided at the leading end of the arm portion 54B in a direction toward, or away from, the wire guide 52. The movement portion 54C is disposed facing the indented portion 52E formed in the guide face 52D of the wire guide 52. By moving the movement portion 54C toward the wire guide 52 side, the energy absorbing wire 50 is sandwiched (such as clamped) between the movement portion 54C and the wire guide 52 and is deformed in a shape running along the guide face 52D of the wire guide 52.

The cam 56 includes the shaft portion 56A formed in a substantially circular column shape, and a cam body portion 56B that is provided on another side in the axial direction of the shaft portion 56A and that, by being rotated, presses the movement portion 54C of the lever 54. As illustrated in FIG. 4, the cam body portion 56B is formed in a partially cutout circular column shape. A large diameter portion 56C, a small diameter portion 56D set with a smaller radius of curvature than the large diameter portion 56C, and a connecting portion 56E that connects the large diameter portion 56C and the small diameter portion 56D together, are thereby provided at an outer peripheral portion of the cam body portion 56B. In a state in which the large diameter portion 56C of the cam body portion 56B and the movement portion 54C of the lever 54 abut each other, the movement portion 54C of the lever 54 is disposed close to the guide face 52D of the wire guide 52. In a state in which the small diameter portion 56D of the cam body portion 56B and the movement portion 54C of the lever 54 abut each other, the movement portion 54C of the lever 54 is disposed separated from the guide face 52D of the wire guide 52.

Figure 5:
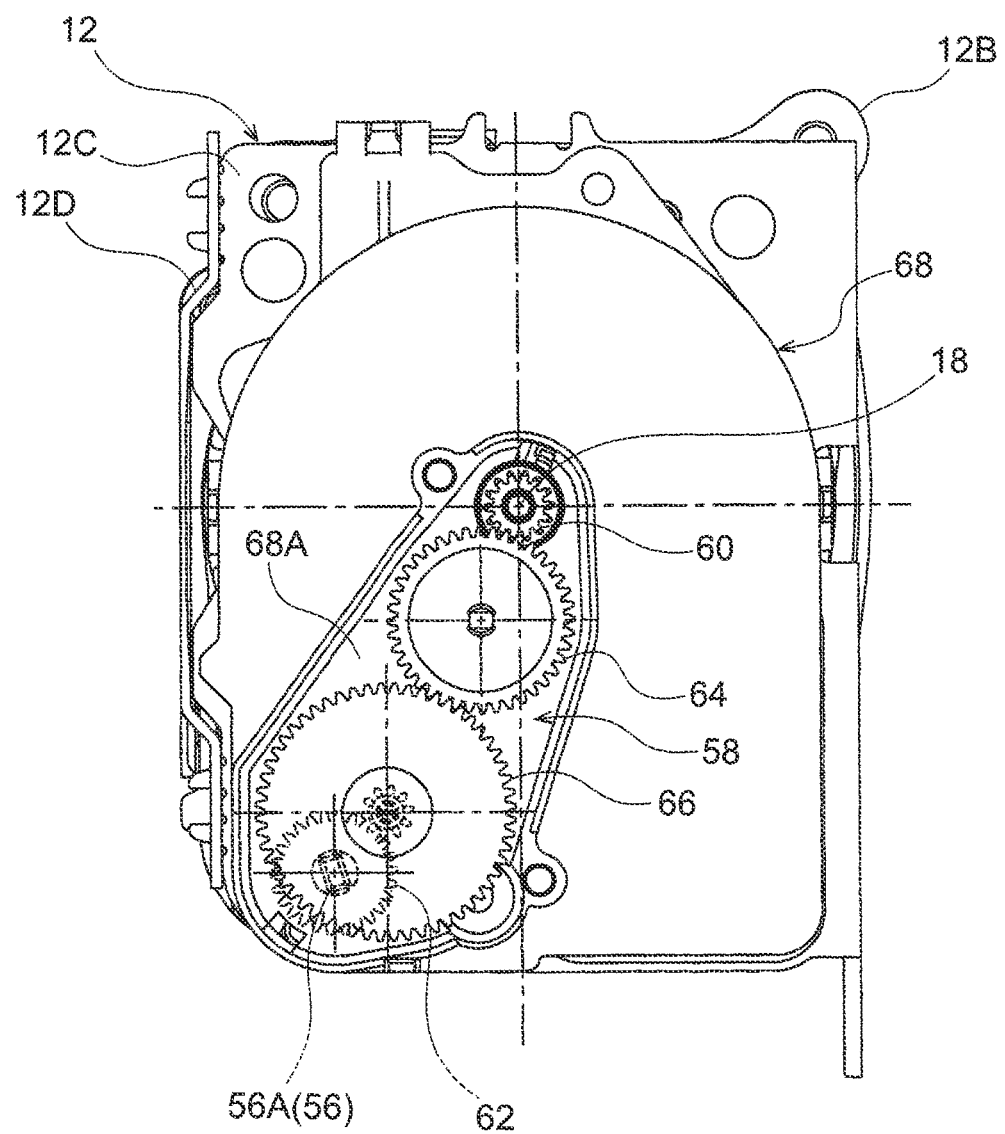
FIG. 5 is a face-on view illustrating a cam turning mechanism.
Figure 6:
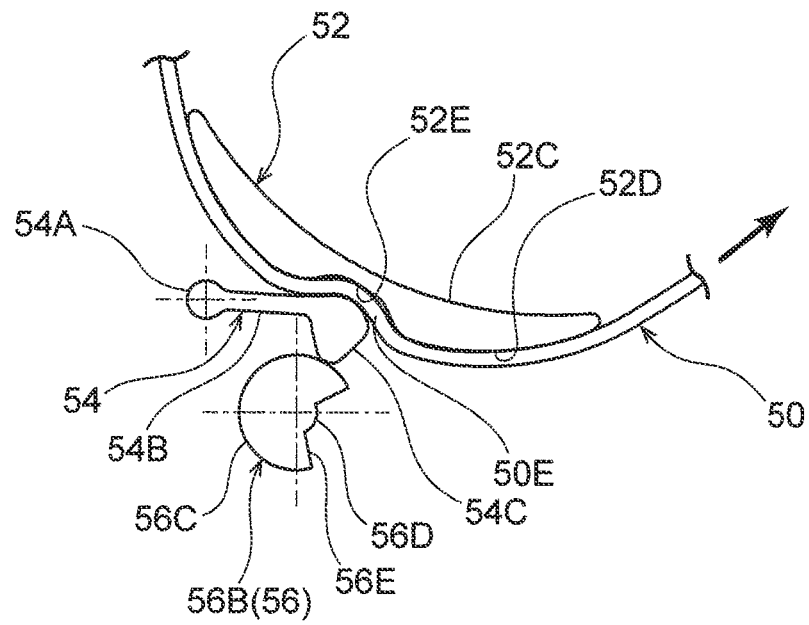
FIG. 6 is an enlarged face-on view illustrating a cam, a lever, and so on when webbing is worn by an occupant with a large build.
Figure 7:
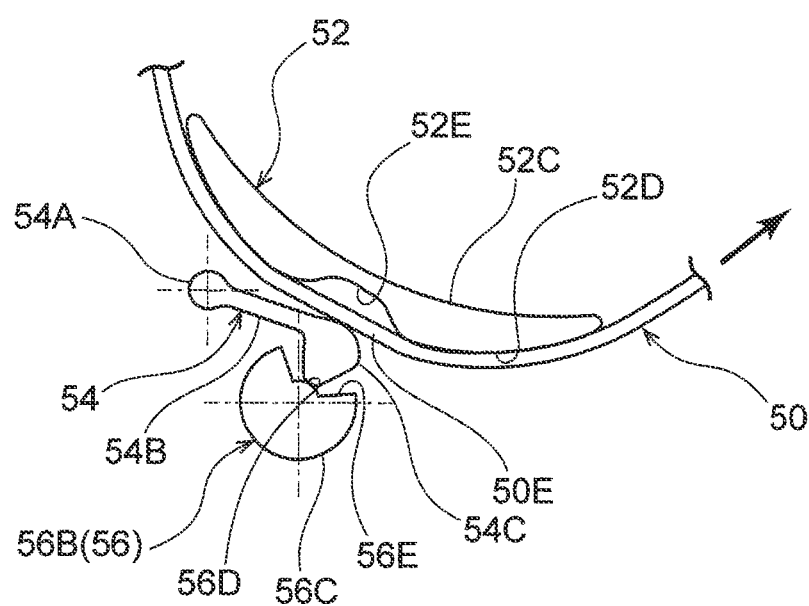
FIG. 7 is an enlarged face-on view illustrating a cam, a lever, and so on when webbing is worn by an occupant with a small build.

As illustrated in FIG. 5, the cam 56 is rotated at a reduced speed by a cam rotating (turning) mechanism 58. Specifically, the cam turning mechanism 58 is configured including a primary gear 60 that is attached to an end portion on the one side in the axial direction of the torsion shaft 18 so as to be capable of rotating integrally with the spool 14, a final gear 62 that is attached to an end portion on the one side in the axial direction of the cam 56, and a first intermediate gear 64 and a second intermediate gear 66 that transmit rotation of the primary gear 60 to the final gear 62. As illustrated in FIG. 7, the small diameter portion 56D of the cam body portion 56B and the movement portion 54C of the lever 54 abut each other when a specific length of the webbing 100 has been pulled from the spool 14 from a state in which the webbing 100 is fully wound on the spool 14. Thus, the movement portion 54C of the lever 54 is disposed separated from the guide face 52D of the wire guide 52. As illustrated in FIG. 6, after the connecting portion 56E of the cam body portion 56B and the movement portion 54C of the lever 54 have abutted each other, the large diameter portion 56C of the cam body portion 56B and the movement portion 54C of the lever 54 abut each other, when the webbing 100 has been pulled out from the spool 14 beyond the above mentioned specific length. The movement portion 54C of the lever 54 is thereby disposed close to the guide face 52D of the wire guide 52. Note that in the present exemplary embodiment, setting is performed such that the amount of webbing 100 pulled out from the spool 14 does not exceed the above mentioned specific length when the webbing 100 is worn by an occupant with a small build, and such that the amount of webbing 100 pulled out from the spool 14 exceeds the above mentioned specific length when the webbing 100 is worn by an occupant with a large build. Note that an occupant with a small build is an occupant with a similar physique to an AF05 dummy, and an occupant with a large build is an occupant with a similar physique to an AM50 dummy. As illustrated in FIG. 5, in the present exemplary embodiment, the primary gear 60, the final gear 62, the first intermediate gear 64, and the second intermediate gear 66 configuring the cam turning mechanism 58 are disposed inside a gear housing recessed section 68A formed in a gear case 68 attached to the leg piece 12C of the frame 12. The gear housing recessed section 68A is closed off by a gear cover 70 (see FIG. 1).

Explanation follows regarding the rotation force transmitting mechanism 82, this being a relevant (main) portion of the present exemplary embodiment.

Figure 10:
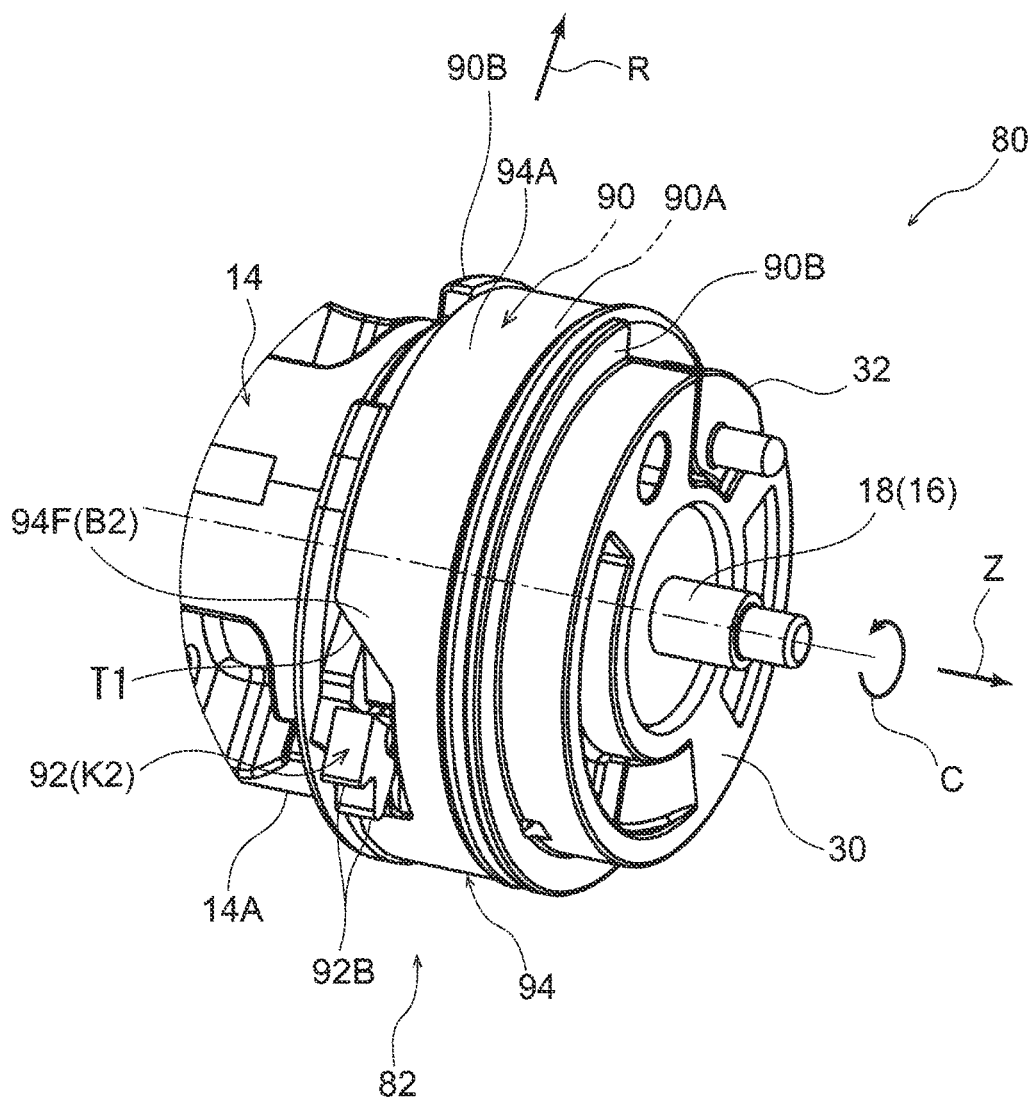
FIG. 10 is an enlarged perspective view illustrating a location of a spool assembly body provided with a rotation force transmitting mechanism, illustrating a state in which a restricting portion of a trigger ring is disposed in a restricting position and a pawl is disposed in a housed position.
Figure 11:
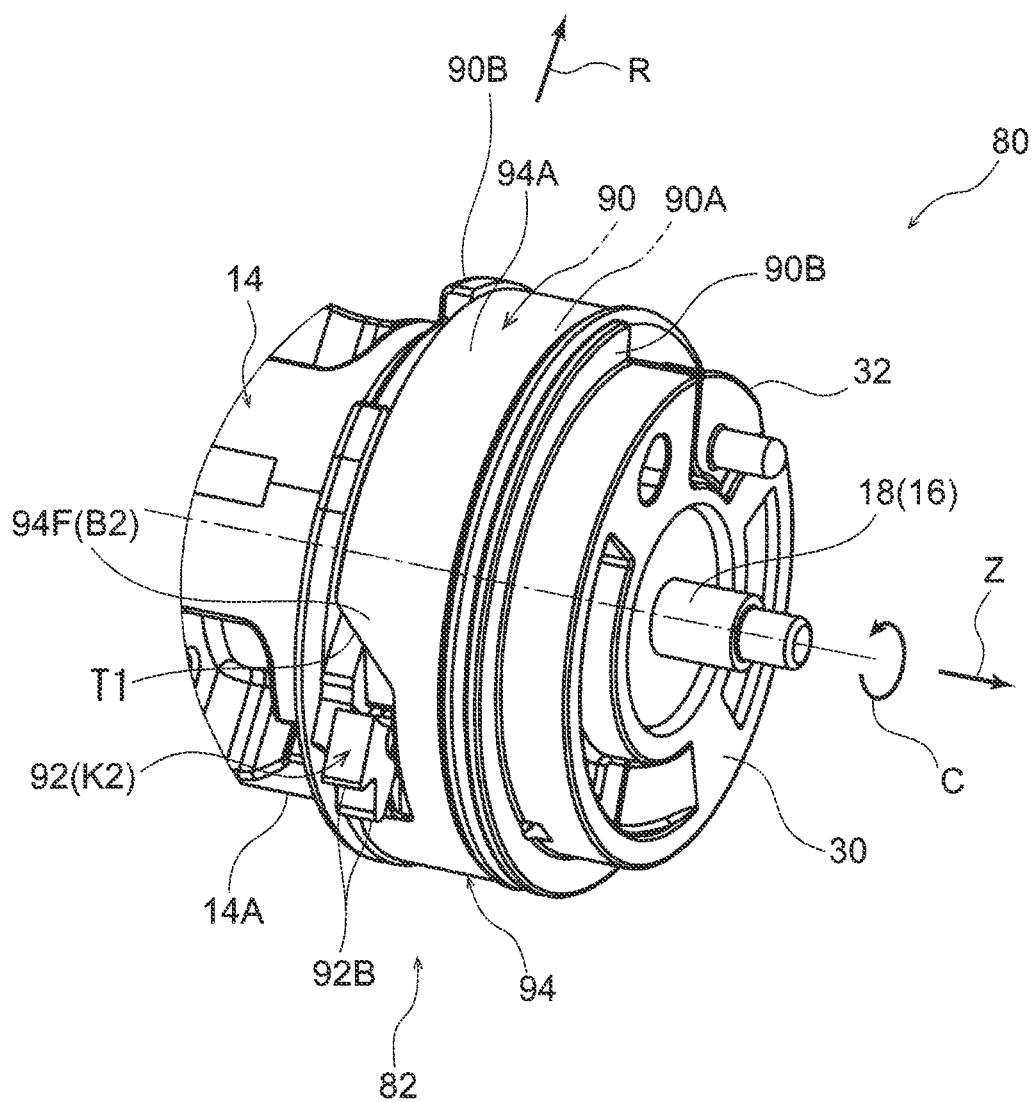
FIG. 11 is an enlarged perspective view corresponding to FIG. 10, illustrating a location of a spool assembly body provided with a rotation force transmitting mechanism, and illustrating a state in which a restricting portion of a trigger ring is disposed in a permitting position and a pawl is disposed in an engaged position.

As illustrated in FIG. 10 and FIG. 11, the rotation force transmitting mechanism 82 transmits rotation force of the spool 14 to the winding ring 48 previously described (see FIG. 3). The rotation force transmitting mechanism 82 is configured including a pawl housing section 90 provided at the end portion on the one axial direction side of the spool 14, the pawl 92 that is housed inside the pawl housing section 90, and a trigger ring 94 serving as a restricting member and a pawl displacement member attached to an outer peripheral portion of the pawl housing section 90.

As illustrated in FIG. 2, the pawl housing section 90 is provided adjacent to the take-up section 14A at which the webbing 100 is taken up. The outer peripheral face of the pawl housing section 90 configures a trigger ring attachment section 90A serving as a restricting member winding section and a pawl displacement member winding section. A pair of flanges 90B are formed at the trigger ring attachment section 90A, projecting out toward the radial direction outside on the one side and the another side in the axial direction of the trigger ring attachment section 90A. The height (dimension in the radial direction) of the flanges 90B with respect to the trigger ring attachment section 90A is set with a higher dimension than the thickness of the trigger ring 94, described below. A pawl housing hole 90C that is open toward the radial direction outside is formed in the pawl housing section 90. An end portion on the radial direction inside and another side in the circumferential direction of the pawl housing hole 90C configures a support portion 90D that supports the pawl 92 so as to allow moving with tilt manner (swinging) (see FIG. 13 also). A connecting portion-placement recessed portion 90E, disposed such that a connecting portion 94H of the trigger ring 94, described later, is capable of moving in the circumferential direction, is formed in an outer peripheral portion of an end portion on the one side in the axial direction of the pawl housing section 90. Part of an edge on the another side in the circumferential direction of the connecting portion-placement recessed portion 90E configures an abutting portion 90F to which the connecting portion 94H is abutted.

Figure 13:
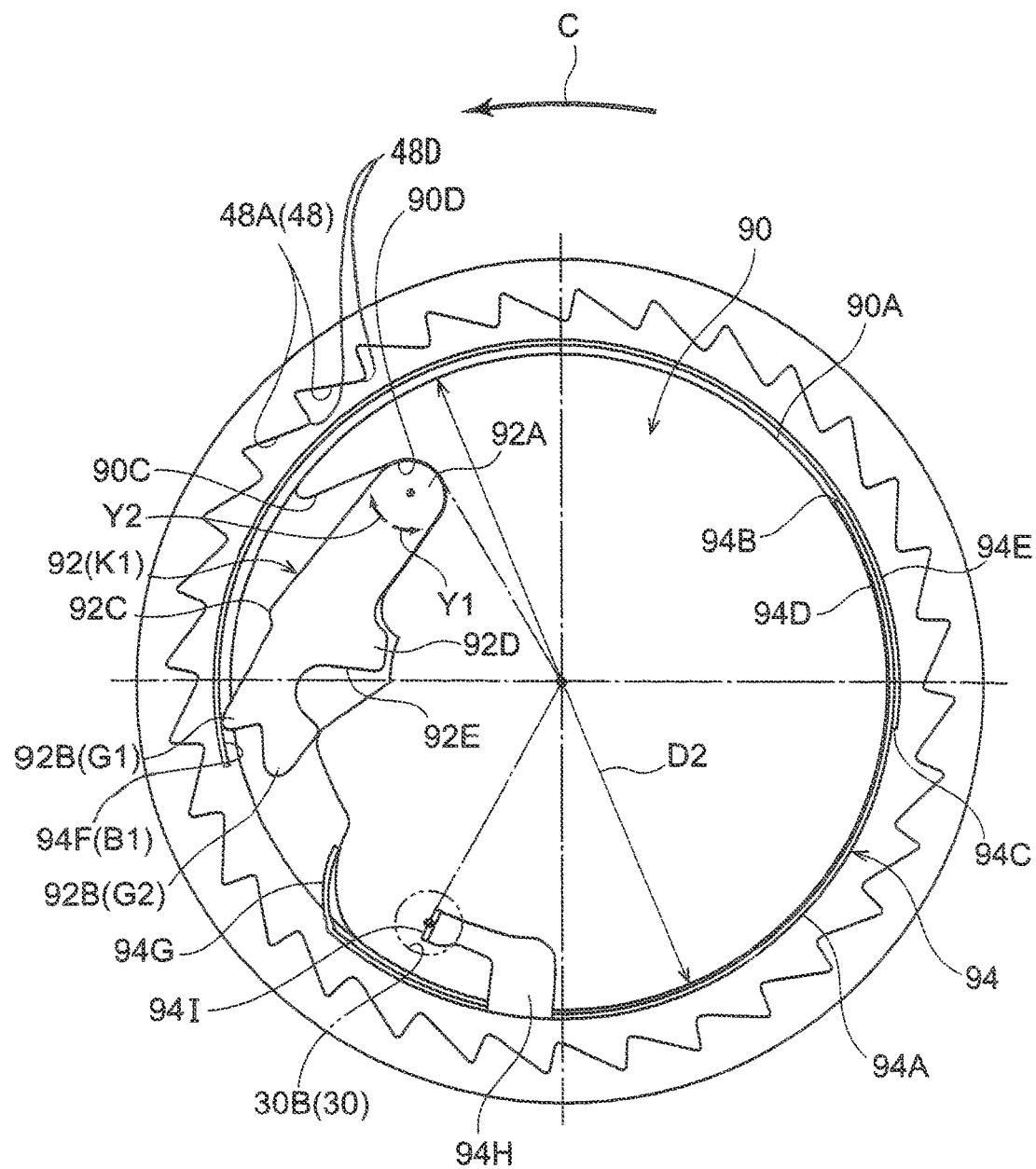
FIG. 13 is an explanatory view for explaining operation of a rotation force transmitting mechanism, illustrating a state prior to a spool being rotated with respect to a lock base.
Figure 17:
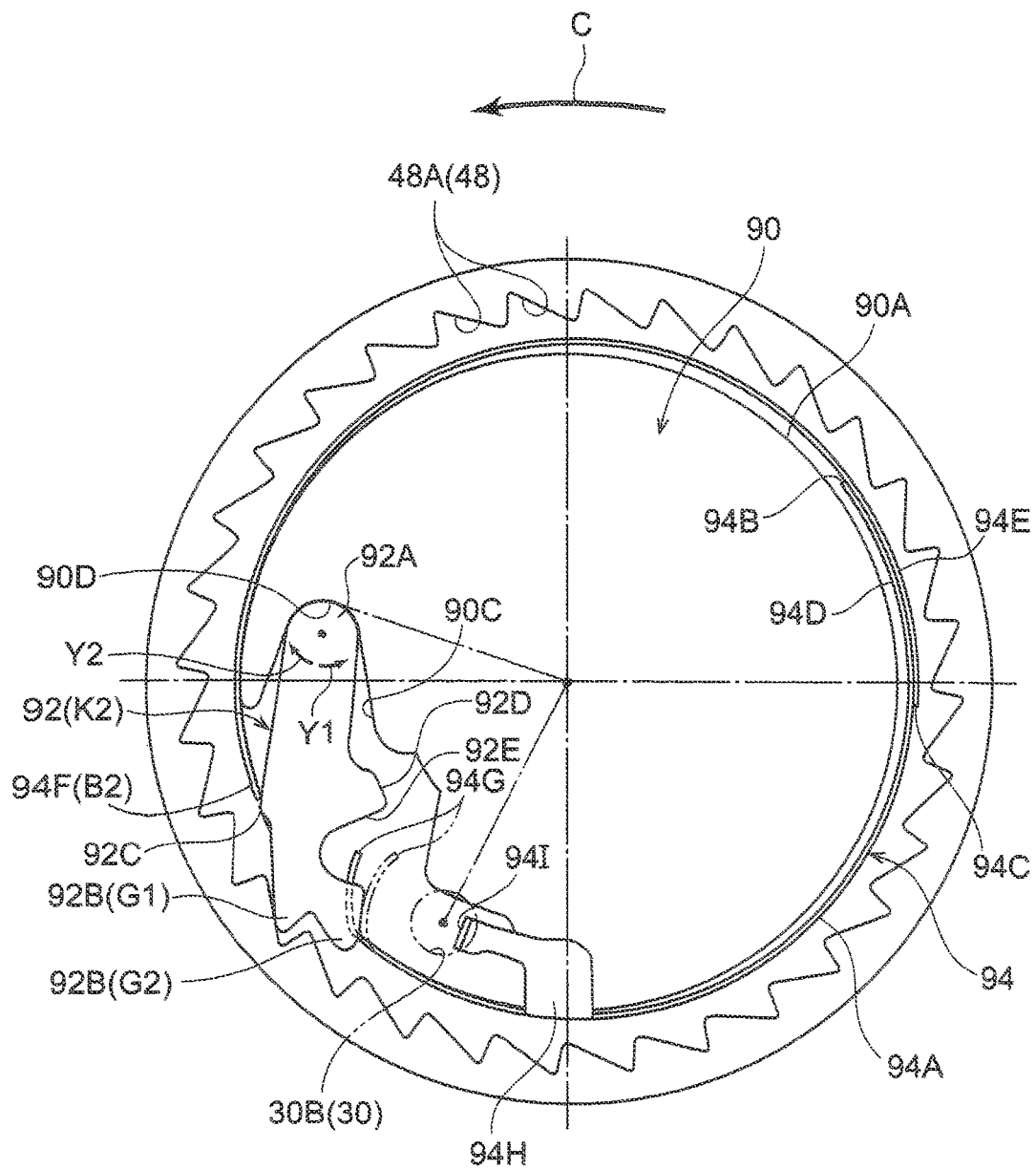
FIG. 17 is an explanatory view corresponding to FIG. 13 and so on for explaining operation of a rotation force transmitting mechanism, illustrating a state in which a pawl is disposed in an engaged position.
Figure 18:
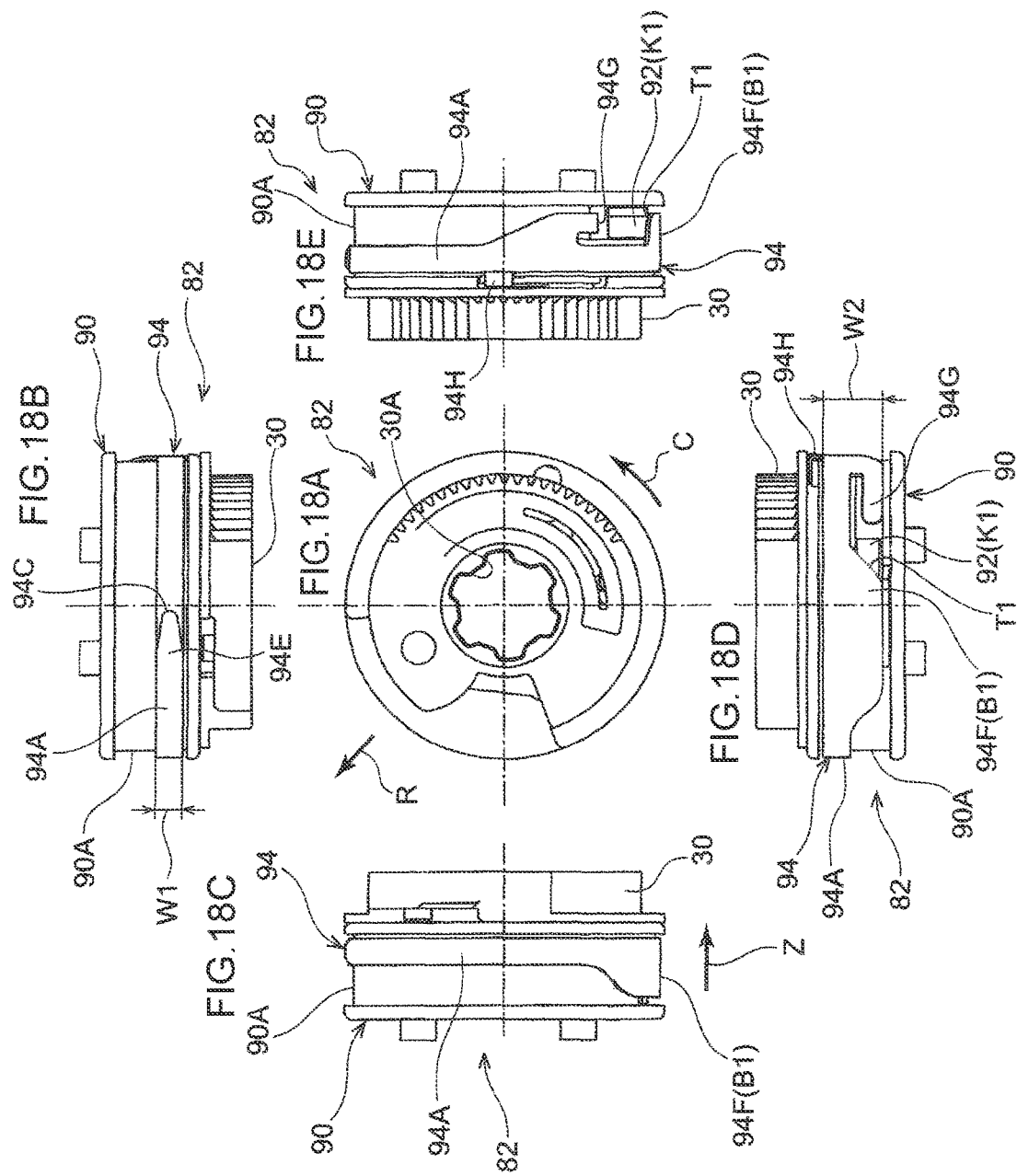
FIG. 18A is a plan view illustrating a rotation force transmitting mechanism according to a second exemplary embodiment.
FIG. 18B is a top view of the rotation force transmitting mechanism illustrated in FIG. 18A.
FIG. 18C is a left side view of the rotation force transmitting mechanism illustrated in FIG. 18A.
FIG. 18D is a bottom view of the rotation force transmitting mechanism illustrated in FIG. 18A.
FIG. 18E is a right side view of the rotation force transmitting mechanism illustrated in FIG. 18A.

As illustrated in FIG. 13, the pawl 92 is disposed inside the pawl housing hole 90C formed in the pawl housing section 90 of the spool 14. An end portion on one side in the length direction of the pawl 92 configures a supported portion 92A that is supported by the support portion 90D provided inside the pawl housing hole 90C. Two engagement teeth 92B, disposed adjacent to each other along the circumferential direction, are provided at an end portion on another side in the length direction of the pawl 92. The engagement tooth 92B on the another side in the circumferential direction is referred to as a main engagement tooth 92B (G1), and the engagement tooth 92B disposed on the one side in the circumferential direction is referred to as an auxiliary engagement tooth 92B (G2). A raised portion 92C formed in a shape protruding toward the radial direction outside is formed at a location at the radial direction outside of a length direction intermediate portion of the pawl 92. A leg portion 92D is formed in a shape protruding toward the radial direction inside at a location on the radial direction inside of the length direction intermediate portion of the pawl 92. An indentation (recessed portion) 92E that is open toward the radial direction inside is formed between the leg portion 92D and the auxiliary engagement tooth 92B (G2) of the pawl 92. Note that a state in which the pawl 92 has swung furthest in the arrow Y1 direction about the support portion 90D is referred to as a state in which the pawl 92 is positioned in a housed position K1. In the present exemplary embodiment, the depth of the pawl housing section 90 (the depth of the pawl housing section 90 in the length direction of the pawl 92 in the state in which the pawl 92 is positioned in the housed position K1) is set shallower (smaller) than a dimension of the pawl 92 in the length direction. Thus, in the state in which the pawl 92 is positioned in the housed position K1, a tooth tip of the main engagement tooth 92B (G1) is positioned slightly further toward the radial direction outside than the trigger ring attachment section 90A. As illustrated in FIG. 17, a state in which the pawl 92 has been swung in the arrow Y2 direction, which is a direction opposite to the arrow Y2 direction, about the support portion 90D, and the engagement teeth 92B of the pawl 92 are capable of engaging with the engagement tooth portions 48A of the winding ring 48, is referred to as a state in which the pawl 92 is positioned in an engaged position K2. In the state in which the pawl 92 is positioned in the engaged position K2, the main engagement tooth 92B (G1) and the auxiliary engagement tooth 92B (G2) of the pawl 92 are positioned further toward the radial direction outside than the trigger ring attachment section 90A.

Figure 12:
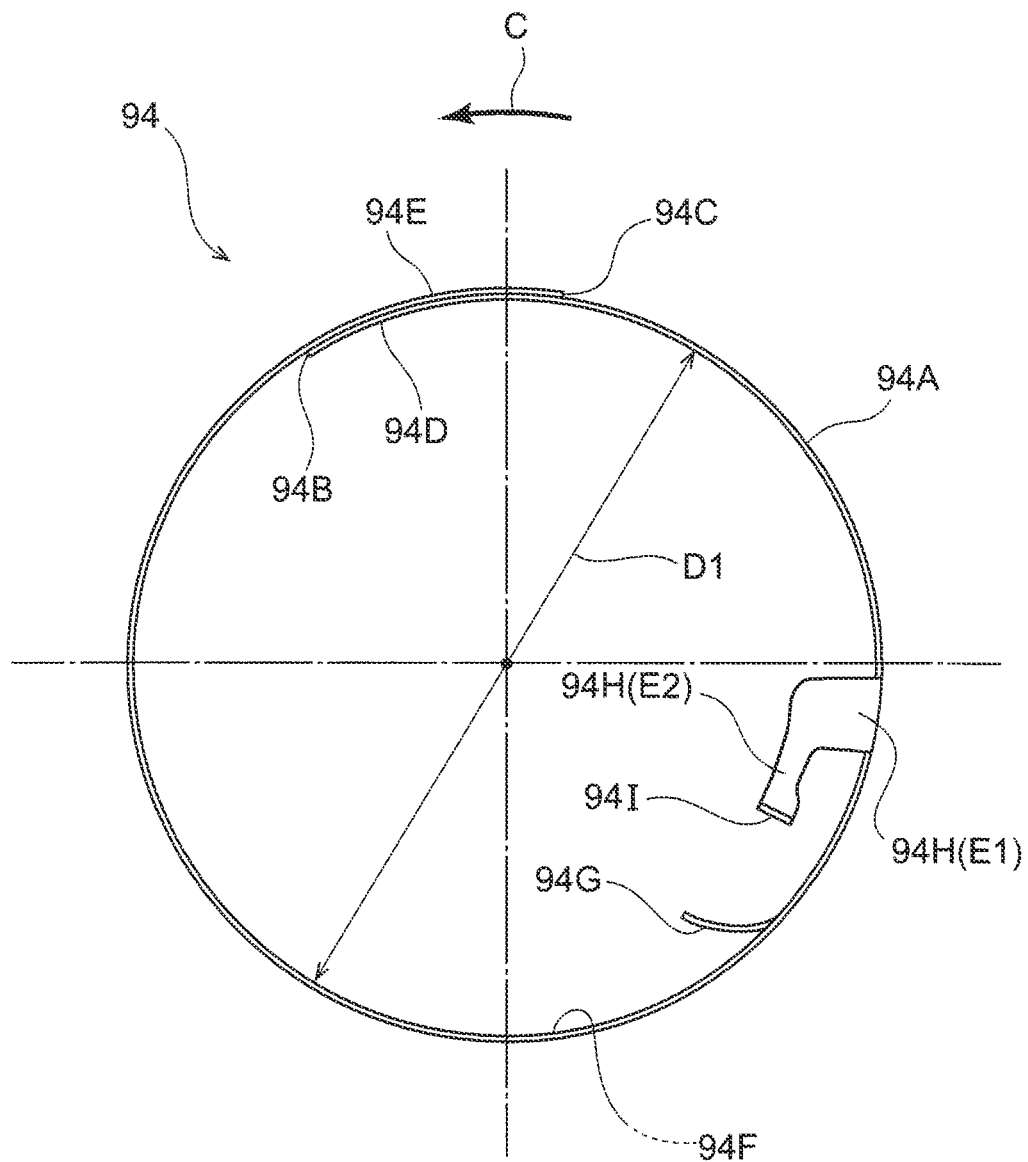
FIG. 12 is a plan view illustrating a trigger ring.

As illustrated in FIG. 2 and FIG. 12, the trigger ring 94 is formed by bending and the like a single plate shaped member, for example, formed by punching a metal plate such as steel plate into a specific shape. Specifically, the trigger ring 94 is formed in a ring shape and includes a wound section 94A extending with its thickness direction being in the radial direction. In the present exemplary embodiment, a dimension (length in the circumferential direction) from an end 94B on the one side in the circumferential direction to an end 94C on the another side in the circumferential direction of the wound section 94A is set longer than an inner peripheral length in the circumferential direction (a circumferential length of a circle passing through tooth tips of the engagement tooth portions 48A in axial direction view) of the winding ring 48 (see FIG. 3). In addition thereto, in the present exemplary embodiment, an end portion 94D (first end portion) on the one side in the circumferential direction and an end portion 94E (second end portion) on the another side in the circumferential direction of the wound section 94A overlap each other, and the end portion 94E on the another circumferential direction side of the wound section 94A is disposed further toward the radial direction outside than the end portion 94D on the one circumferential direction side. An internal diameter D1 of the wound section 94A in a state prior to the wound section 94A being attached to the trigger ring attachment section 90A of the pawl housing section 90 is set smaller than an external diameter D2 (see FIG. 13) of the trigger ring attachment section 90A. The wound section 94A is wound onto and retained by the trigger ring attachment section 90A by spring force occurring in the trigger ring 94 (the wound section 94A) due to the internal diameter of the wound section 94A being expanded so as to correspond to the external diameter D2 of the trigger ring attachment section 90A.

As illustrated in FIG. 13, in a state in which the wound section 94A has been wound onto the trigger ring attachment section 90A and further in a state in which the spool assembly body 80 has been assembled, part of the wound section 94A covers the main engagement tooth 92B (G1) and the auxiliary engagement tooth 92B (G2) of the pawl 92 from the radial direction outside, and presses the tooth tip of the main engagement tooth 92B (G1) toward the radial direction inside. Note that the part of the wound section 94A that covers the main engagement tooth 92B (G1) and the auxiliary engagement tooth 92B (G2) of the pawl 92 from the radial direction outside is referred to as a restricting portion 94F. A state in which the restricting portion 94F is disposed in a position covering the main engagement tooth 92B (G1) and the auxiliary engagement tooth 92B (G2) is referred to as a state in which the restricting portion 94F is disposed in a restricting position B1. As illustrated in FIG. 10 and FIG. 11, an end T1 (an end on the another side in the axial direction) of the restricting portion 94F that is disposed facing the plural engagement tooth portions 48A of the winding ring 48 in the radial direction is inclined (curved) toward the one side in the axial direction on progression toward the one side in the circumferential direction. Note that, as illustrated in FIG. 13, a circumference dimension in the circumferential direction of the inclined (curved) end T1 of the restricting portion 94F that is disposed facing the plural engagement tooth portions 48A of the winding ring 48 in the radial direction is set to a dimension that exceeds the pitch between the plural engagement tooth portions 48A of the winding ring 48. Namely, the circumference dimension is set that exceeds a spacing in the circumferential direction between a tooth tip 48D of one engagement tooth portion 48A and a tooth tip 48D of another engagement tooth portion 48A disposed adjacent to the one engagement tooth portion 48A in the circumferential direction.

Figure 15:
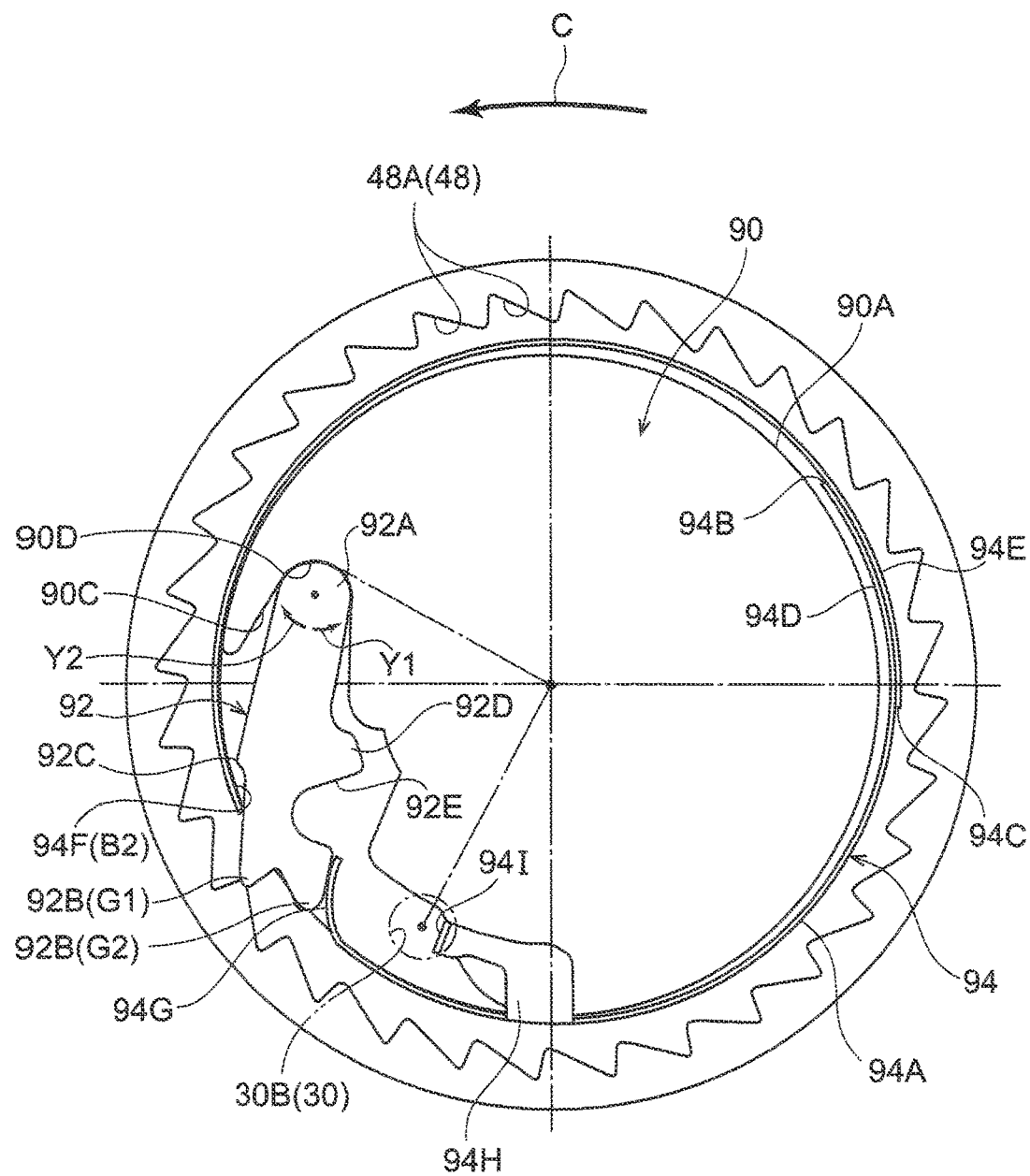
FIG. 15 is an explanatory view corresponding to FIG. 13 and so on for explaining operation of a rotation force transmitting mechanism, illustrating a state in which a pawl abuts a pawl abut portion of a trigger ring.
Figure 16:
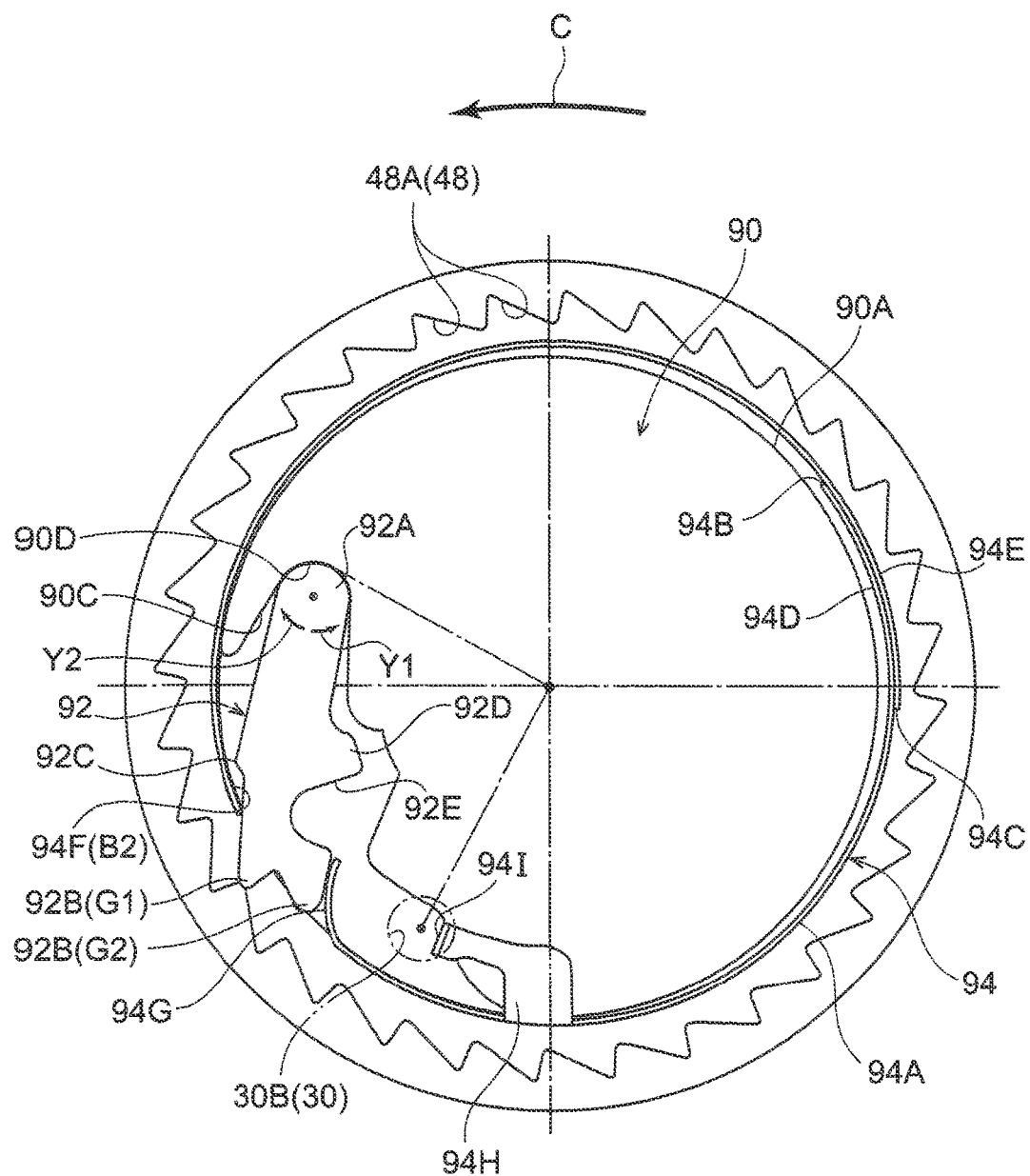
FIG. 16 is an explanatory view corresponding to FIG. 13 and so on for explaining operation of a rotation force transmitting mechanism, illustrating a process in which a pawl is moving toward an engaged position side.

As illustrated in FIG. 15 to FIG. 17, when the spool 14 is rotated toward the one side in the circumferential direction with respect to the trigger ring 94 (when the trigger ring 94 is displaced toward the another side in the circumferential direction with respect to the spool 14), the restricting portion 94F is disposed in a position that does not cover the main engagement tooth 92B (G1) or the auxiliary engagement tooth 92B (G2). Note that a state in which the restricting portion 94F is disposed in a position that does not cover the main engagement tooth 92B (G1) or the auxiliary engagement tooth 92B (G2) is referred to as a state in which the restricting portion 94F is disposed in a permitting position B2. Disposing the restricting portion 94F in the permitting position B2 permits the pawl 92 to be swung toward the arrow Y2 direction side.

As illustrated in FIG. 2 and FIG. 12, the trigger ring 94 includes a pawl abut portion 94G that extends out from a location which is on the another side in the axial direction of the wound section 94A toward the inside of the pawl housing hole 90C formed in the pawl housing section 90 (toward the radial direction inside), and that is disposed on the one side in the circumferential direction with respect to the pawl 92 provided inside the pawl housing hole 90C. The pawl abut portion 94G is inclined toward the another side in the circumferential direction and toward the radial direction inside in axial direction view. As illustrated in FIG. 17, the pawl abut portion 94G is capable of deforming toward the opposite side to the pawl 92 when abutted by the pawl 92, and also capable of returning toward the pawl 92 side from the deformed state.

As illustrated in FIG. 2 and FIG. 12, the trigger ring 94 includes the connecting portion 94H, serving as a facing portion and an abut portion, extending from an end on the one side in the axial direction of the wound section 94A toward the radial direction inside. The connecting portion 94H extends with its thickness direction being the axial direction. The connecting portion 94H is configured including a first extension portion E1 formed in a substantially rectangular shape in axial direction view, and a second extension portion E2 extending from the radial direction inside portion of the first extension portion E1 toward the another side in the circumferential direction. The connecting portion 94H explained above is disposed inside the connecting portion-placement recessed portion 90E formed in the pawl housing section 90, thereby limiting a displacement amount (rotation (turn) angle) of the trigger ring 94 with respect to the spool. The connecting portion 94H is disposed between the connecting portion-placement recessed portion 90E formed in the pawl housing section 90 and the base lock 30, such that movement of the connecting portion 94H in the axial direction is restricted.

Figure 14:
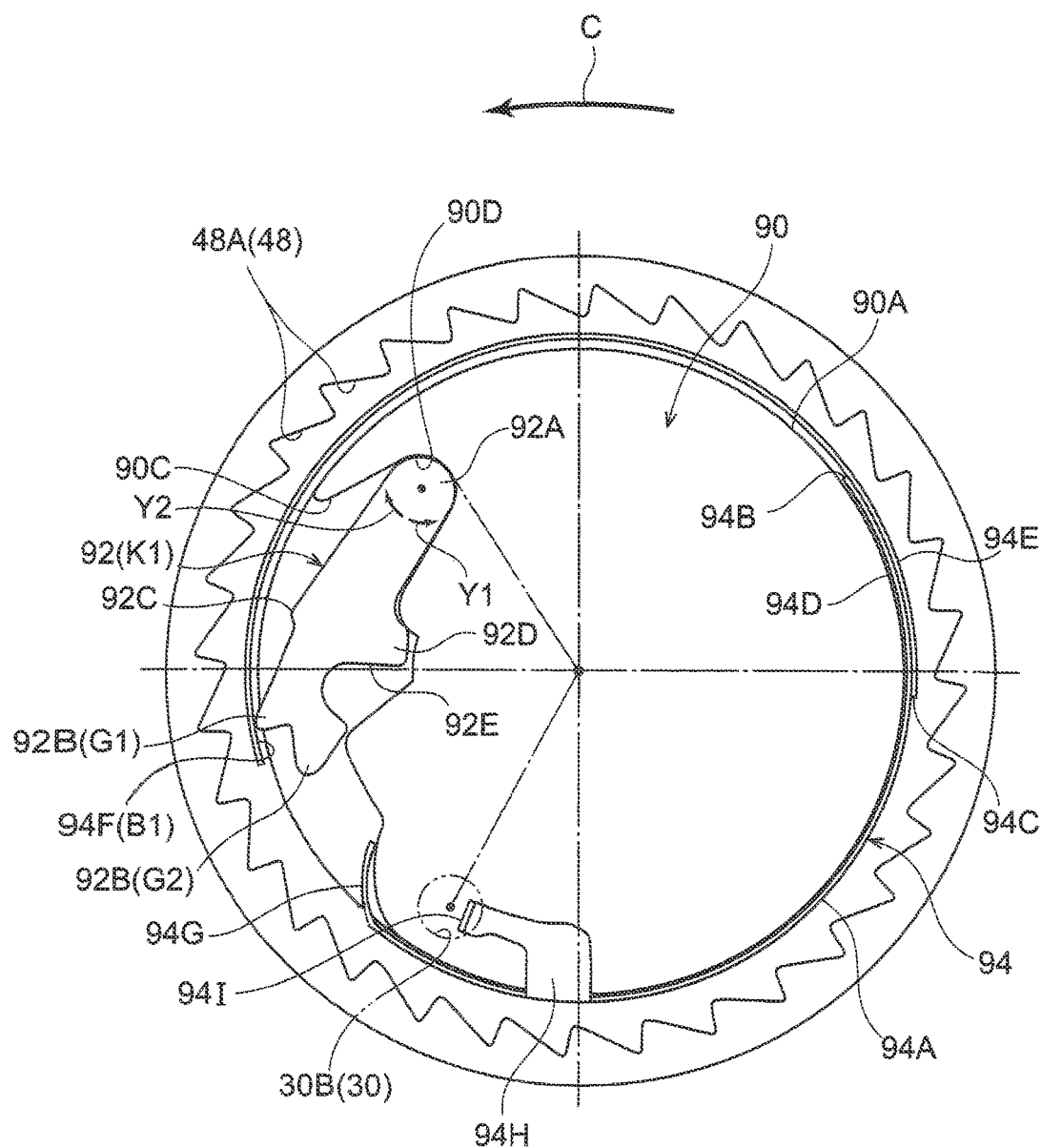
FIG. 14 is an explanatory view corresponding to FIG. 13 for explaining operation of a rotation force transmitting mechanism, illustrating a state when a spool has started to be rotated with respect to a lock base.

Further, the trigger ring 94 includes a stop portion 94I extending from an end portion on the another side in circumferential direction of the connecting portion 94H (the second extension portion E2) toward the one side in the axial direction. The stop portion 94I is stopped at a circular shaped stop hole 30B, serving as a stopping portion, formed in the base lock 30. Note that the stop hole 30B is illustrated by a double-dotted dashed line in FIG. 13 to FIG. 17. As illustrated in FIG. 13, in a state in which the spool assembly body 80 has been assembled, the stop portion 94I is disposed at a central portion of the stop hole 30B in a state not abutting an edge of the stop hole 30B. Then, as illustrated in FIG. 14, when the spool 14 is rotated in the pull-out direction with respect to the base lock 30 (see FIG. 2 also), the stop portion 94I is abutted by the edge of the stop hole 30B. Displacement of the trigger ring 94 toward the one side in the circumferential direction with respect to the base lock 30 is thereby restricted. When the spool 14 is further rotated in the pull-out direction with respect to the base lock 30, the spool 14 is rotated (displaced) toward the one side in the circumferential direction with respect to the trigger ring 94 (the trigger ring 94 is displaced toward the another side in the circumferential direction with respect to the spool 14). Thus, as illustrated in FIG. 15, the restricting portion 94F of the trigger ring 94 is disposed (shifted) from the restricting position B1 to the permitting position B2, and, as illustrated in FIG. 16, the auxiliary engagement tooth 92B (G2) of the pawl 92 abuts the pawl abut portion 94G of the trigger ring 94, and is then moved along the pawl abut portion 94G As illustrated in FIG. 17, the pawl 92 is disposed (shifted) from the housed position K1 to the engaged position K2, so the engagement teeth 92B of the pawl 92 engage with the engagement tooth portions 48A of the winding ring 48 as a result. Rotation force of the spool 14 is thereby transmitted to the winding ring 48, and the winding ring 48 is rotated in the pull-out direction together with the spool 14.

When the restricting portion 94F of the trigger ring 94 is disposed in the permitting position B2, the connecting portion 94H (the first extension portion E1) of the trigger ring 94 is abutted by the abutting portion 90F of the connecting portion-placement recessed portion 90E (see FIG. 2). Displacement of the trigger ring 94 toward the another side in the circumferential direction with respect to the spool 14 is thereby restricted. When the spool 14 is rotated in the pull-out direction together with the trigger ring 94 in a state in which the connecting portion 94H (the first extension portion E1) of the trigger ring 94 is abutted by the abutting portion 90F of the connecting portion-placement recessed portion 90E, the stop portion 94I of the trigger ring 94 is deformed and comes away from the stop hole 30B provided in the base lock 30.

Operation and Advantageous Effects of Present Exemplary Embodiment

Explanation follows regarding operation and advantageous effects of the present exemplary embodiment.

As illustrated in FIG. 1, in the present exemplary embodiment, the webbing 100 is worn on the body of a vehicle occupant by pulling out the webbing 100 from the spool 14.

When the lock mechanism is actuated due to the vehicle colliding in a state in which the webbing 100 is worn on the body of the vehicle occupant, rotation of the base lock 30 in the pull-out direction is prevented. Rotation in the pull-out direction of the spool 14 that is coupled to the base lock 30 through the torsion shaft 18 is accordingly limited, and the webbing 100 is limited from being pulled out of the spool 14. The body of the occupant attempting to move toward the vehicle front is thereby restrained by the webbing 100.

When the gas generator 42 is actuated due to the vehicle colliding, the non-illustrated rack is moved, and the pinion gear 88 that meshes with the rack is rotated in the take-up direction. The spool 14 is thereby rotated in the take-up direction. Thus, a specific length of the webbing 100 is taken up onto the spool 14, slack of the webbing 100 worn by the occupant is eliminated, and restraint force for the occupant by the webbing 100 is increased.

When, in a state in which rotation of the base lock 30 in the pull-out direction has been restricted, the body of the occupant pulls the webbing 100 with an even greater force, and the rotation force of the spool 14 in the pull-out direction based on this pulling force exceeds a twisting withstand load (deformation withstand load) of the twisting portion 18A of the torsion shaft 18 (see FIG. 2), the twisting portion 18A is twisted (deformed). Namely, the first force limiter mechanism 16 is actuated. Thus, rotation in the pull-out direction is permitted at the force limiter load of the spool 14 (the twisting withstand load of the twisting portion 18A) or greater. Rotation of the spool 14 in the pull-out direction is thereby permitted by the twisting of the twisting portion 18A, and load (burden) on the chest of the occupant due to the webbing 100 is alleviated due to the webbing 100 being permitted to be pulled out from the spool 14. Kinetic energy of the occupant, provided into pull on the webbing 100, is absorbed by the amount that the twisting portion 18A is twisted.

As illustrated in FIG. 4 and FIG. 6, in a state in which the large diameter portion 56C of the cam body portion 56B and the movement portion 54C of the lever 54 abut each other due to the webbing 100 being worn by an occupant with a large build, the movement portion 54C of the lever 54 is disposed close to the guide face 52D of the wire guide 52. Thus, the energy absorbing wire 50 is sandwiched between the movement portion 54C and the wire guide 52 and is deformed into a substantially waved shape along the guide face 52D of the wire guide 52.

As illustrated in FIG. 11 and FIG. 17, when the spool 14 starts to be rotated in the pull-out direction with respect to the base lock 30, namely, when the torsion shaft 18 starts to be twisted, the rotation force transmitting mechanism 82 previously described is actuated, and the engagement teeth 92B of the pawl 92 engage with the engagement tooth portions 48A of the winding ring 48. The spool 14 and the winding ring 48 are thereby integrally rotated in the pull-out direction. As illustrated in FIG. 6, when the winding ring 48 is rotated, the energy absorbing wire 50 is pulled out from between the movement portion 54C and the wire guide 52 while being deformed between the movement portion 54C and the wire guide 52, and, as illustrated in FIG. 9, the energy absorbing wire 50 is wound onto the winding ring 48. Thus, rotation in the pull-out direction is permitted at the force limiter load of the spool 14 (the total of the twisting withstand load of the twisting portion 18A of the torsion shaft 18 and deforming (drawing) load of the energy absorbing wire 50) or greater.

Thus, the twisting portion 18A of the torsion shaft 18 is twisted and the energy absorbing wire 50 is pulled out from between the movement portion 54C and the wire guide 52 while being deformed, thereby alleviating the load (burden) on the chest of the occupant due to the webbing 100, and also absorbing kinetic energy of the occupant, provided into pull on the webbing 100, by the amount of twisting deformation of the twisting portion 18A of the torsion shaft 18 and the amount of deformation of the energy absorbing wire 50.

As illustrated in FIG. 7, in a state in which the small diameter portion 56D of the cam body portion 56B and the movement portion 54C of the lever 54 abut each other due to the webbing 100 being worn by an occupant with a small build, the movement portion 54C of the lever 54 is disposed separated from the guide face 52D of the wire guide 52. Thus, a state arises in which the energy absorbing wire 50 is not deformed, or is barely deformed, between the movement portion 54C and the wire guide 52. Thus, when the spool 14 is rotated in the pull-out direction together with the winding ring 48, the energy absorbing wire 50 is taken up onto the winding ring 48 without being deformed (or is barely deformed) between the movement portion 54C and the wire guide 52. Thus, rotation in the pull-out direction is permitted at the force limiter load of the spool 14 (the twisting withstand load of the twisting portion 18A of the torsion shaft 18) or greater.

As explained above, in the present exemplary embodiment, in a case in which the webbing 100 is worn by an occupant with a large build, the load value of the force limiter load is a high load value. However, in a case in which the webbing 100 is worn by an occupant with a small build, the load value of the force limiter load is a low load value. This enables the occupant to be appropriately protected according to their physique.

Note that in the present exemplary embodiment, as illustrated in FIG. 2 and FIG. 13, the restricting portion 94F of the trigger ring 94 restricts tilting (swinging) of the pawl 92 in a state prior to the spool 14 being rotated with respect to the base lock 30. Namely, the pawl 92 does not engage with the winding ring 48 in a state prior to the spool 14 being rotated with respect to the base lock 30. Thus, the present exemplary embodiment enables rotation force of the spool 14 to be suppressed from being transmitted to the winding ring 48 in a case of transmitting being not required.

In the present exemplary embodiment, the dimension in the circumferential direction of the sloped (curved) end T1 of the restricting portion 94F of the trigger ring 94, the end T1 being disposed facing the plural engagement tooth portions 48A of the winding ring 48 in the radial direction, is set at a dimension that exceeds the pitch between the plural engagement tooth portions 48A of the winding ring 48. Thus, when the spool 14 is rotated in the pull-out direction with respect to the trigger ring 94, the sloped (curved) end T1 spans over two tooth tips 48D provided to adjacent engagement tooth portions 48A. This enables the end T1 of the restricting portion 94F of the trigger ring 94 to be suppressed from unexpectedly engaging with the plural engagement tooth portions 48A of the winding ring 48.

In the present exemplary embodiment, in the state prior to the spool 14 rotating with respect to the base lock 30, the tooth tip of the main engagement tooth 92B (G1) of the pawl 92 is positioned slightly further toward the radial direction outside than the trigger ring attachment section 90A, such that the restricting portion 94F of the trigger ring 94 presses the tooth tip of the main engagement tooth 92B (G1) of the pawl 92 toward the radial direction inside. This enables the pawl 92 that is rotated together with the spool 14 to be suppressed from vibrating inside the pawl housing hole 90C, both when the webbing 100 is pulled out from the spool 14, and when the webbing 100 is taken up onto the spool 14.

In the present exemplary embodiment, the stop portion 94I of the trigger ring 94 is stopped at the stop hole 30B of the base lock 30, thereby restricting displacement of the trigger ring 94 in the circumferential direction with respect to the base lock 30. This enables the restricting portion 94F of the trigger ring 94 to be shifted from the restricting position B1 to being disposed in the permitting position B2 and enables the pawl 92 to be tilted (swung) to the engaged position K2 by rotating the spool 14 in the pull-out direction with respect to the base lock 30, without separately providing a mechanism that shifts the restricting portion 94F of the trigger ring 94 from the restricting position B1 to being disposed in the permitting position B2.

In the present exemplary embodiment, the connecting portion 94H of the trigger ring 94 is disposed between the connecting portion-placement recessed portion 90E formed in the pawl housing section 90, and the base lock 30, such that movement of the connecting portion 94H in the axial direction is restricted. Forming the stop portion 94I so as to extend out from the connecting portion 94H toward the base lock 30 side enables the stop portion 94I of the trigger ring 94 to be suppressed from unexpectedly coming away from the stop hole 30B of the base lock 30.

In the present exemplary embodiment, when the spool 14 is rotated in the pull-out direction together with the trigger ring 94 in a state in which the connecting portion 94H (the first extension portion E1) of the trigger ring 94 is abutted by the abutting portion 90F of the connecting portion-placement recessed portion 90E, the stop portion 94I of the trigger ring 94 is deformed and comes away from the stop hole 30B provided in the base lock 30. This enables the limit on rotation of the spool 14 in the pull-out direction with respect to the base lock 30 by the trigger ring 94 to be suppressed. Namely, pull-out load of the webbing 100 from the spool 14 can be suppressed from becoming an unintentional load.

In the present exemplary embodiment, the wound section 94A of the trigger ring 94 is attached to the trigger ring attachment section 90A of the spool 14, and the wound section 94A of the trigger ring 94 is formed in a plate shape with its thickness direction in the radial direction. This enables the wound section 94A of the trigger ring 94 to be suppressed from projecting out toward the rotation radial direction outside with respect to the trigger ring attachment section 90A of the spool 14. This enables an increase in the size of the body of the webbing take-up device 10 to be suppressed.

In the present exemplary embodiment, in a state prior to the wound section 94A of the trigger ring 94 being attached to the trigger ring attachment section 90A of the pawl housing section 90, the internal diameter D1 of the wound section 94A is set so as to be smaller than the external diameter D2 of the trigger ring attachment section 90A. Thus, the wound section 94A of the trigger ring 94 is expanded in diameter for attachment to the trigger ring attachment section 90A, such that the wound section 94A is wound onto the trigger ring attachment section 90A by spring force. Thus the attachment work can be simplified, and it is stably retained due to the spring force.

In the present exemplary embodiment, the end portion 94D on the one circumferential direction side and the end portion 94E on the another circumferential direction side of the wound section 94A of the trigger ring 94 overlap each other, and the end portion 94E on the another circumferential direction side of the wound section 94A is disposed further toward the radial direction outside than the end portion 94D on the one circumferential direction side thereof. Thus, even though the wound section 94A of the trigger ring 94 has expanded in diameter when the spool 14 is rotated in the pull-out direction, the end portion on the pull-out direction side (the end portion 94D on the one circumferential direction side) of the wound section 94A of the trigger ring 94 can be suppressed from catching on the engagement tooth portions 48A of the winding ring 48.

In the present exemplary embodiment, the wound section 94A of the trigger ring 94 is disposed at the spool 14 radial direction inside with respect to the winding ring 48, and a dimension (circumferential direction length) from the end 94B on the one circumferential direction side of the wound section 94A to the end 94C on the another circumferential direction side thereof is set longer than the inner peripheral length (in the circumferential direction) of the winding ring 48 (the circumferential length of a circle passing through the teeth tips of the engagement tooth portions 48A in axial direction view). Thus, even though the wound section 94A of the trigger ring 94 has expanded in diameter when the spool 14 is rotated in the pull-out direction, the end portion on the pull-out direction side (the end portion 94D on the one circumferential direction side) of the wound section 94A of the trigger ring 94 can be prevented from being exposed to the outer periphery of the wound section 94A and from catching on the engagement tooth portions 48A of the winding ring 48. This enables rotation force of the spool 14 to be prevented from being transmitted to the winding ring 48 through the trigger ring 94.

In the present exemplary embodiment, as illustrated in FIG. 15 to FIG. 17, when the pawl 92 is pressed back toward the opposite side to the engaged position K2 side in the process in which the pawl 92 is displaced toward the engaged position K2 side, the pawl abut portion 94G of the trigger ring 94 is deformed toward the opposite side to the pawl 92. Note that the pawl abut portion 94G that has been deformed toward the opposite side to the pawl 92 is capable of returning toward the pawl 92 side. This enables the pawl 92 that has been pressed back toward the opposite side to the engaged position K2 to be urged toward the engaged position K2 side.

In the present exemplary embodiment, the pawl 92 is disposed on the radial direction inside with respect to the wound section 94A of the trigger ring 94, and the pawl abut portion 94G which is abutted by the pawl 92 extends toward the radial direction inside of the wound section 94A. This enables the rotation force transmitting mechanism 82 that transmits rotation force of the spool 14 to the winding ring 48 to be suppressed from increasing in size in the rotation radial direction of the spool 14.

Rotation Force Transmitting Mechanism according to a Second Exemplary Embodiment Explanation follows regarding a rotation force transmitting mechanism 82 according to a second exemplary embodiment, with reference to FIGS. 18A to 18E. Note that members and sections corresponding to the above exemplary embodiment are appended with the same reference numerals as those in the above exemplary embodiment, and explanation regarding these members and sections is sometimes omitted.

As illustrated in FIGS. 18A to 18E, in the rotation force transmitting mechanism 82 of the present exemplary embodiment, a width W1 of a portion of the wound section 94A of the trigger ring 94 where the pawl abut portion 94G and the restricting portion 94F are not provided is set narrower than a width W2 of a portion of the wound section 94A where the pawl abut portion 94G and the restricting portion 94F are provided. This configuration enables the force required to expand the diameter of the wound section 94A of the trigger ring 94 to be reduced. Thus, the present embodiment enables excellent ease of assembly when attaching the wound section 94A of the trigger ring 94 to the trigger ring attachment section 90A of the pawl housing section 90.

Rotation Force Transmitting Mechanism According to a Third Exemplary Embodiment

Figure 19:
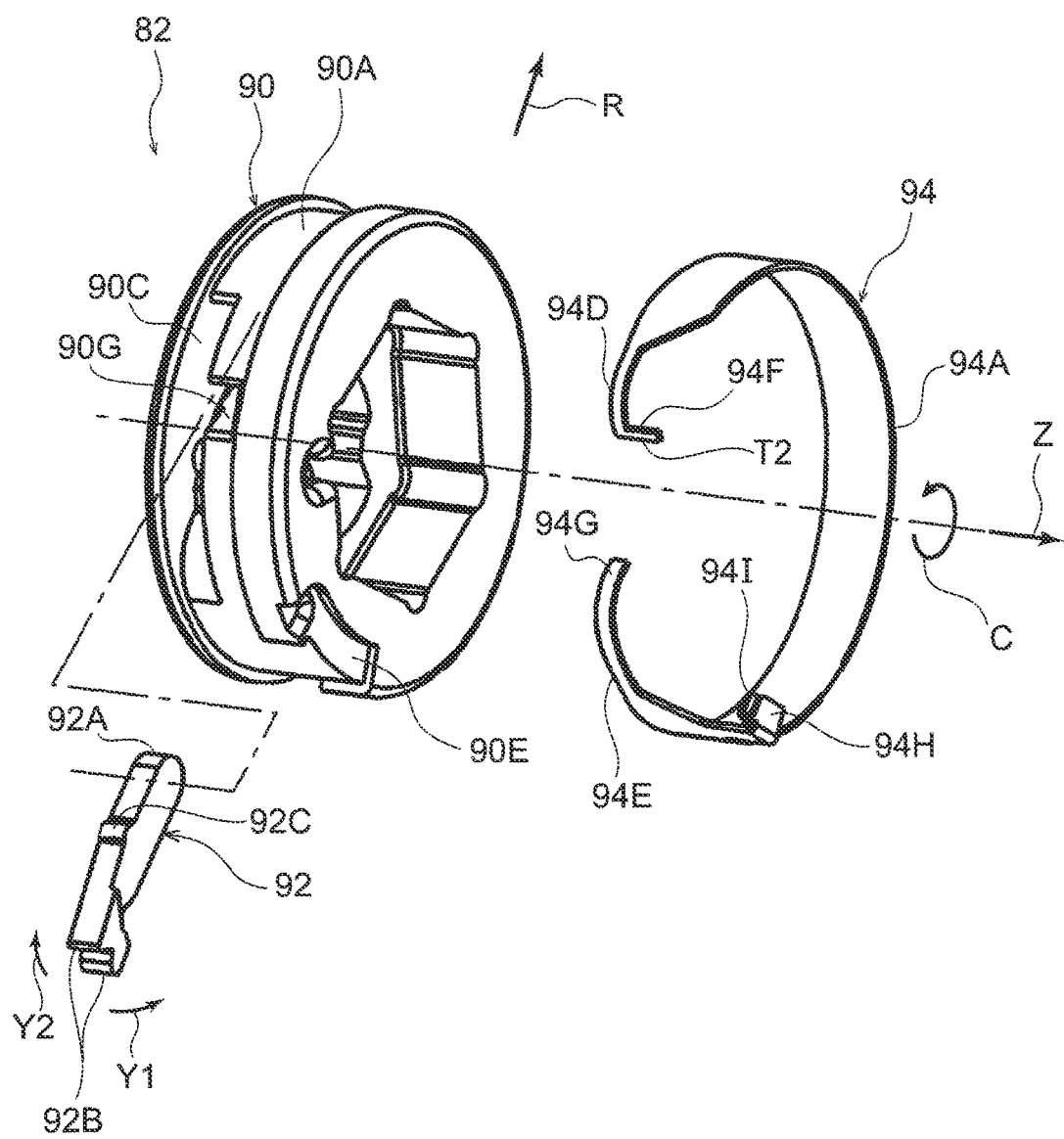
FIG. 19 is an exploded perspective view illustrating a rotation force transmitting mechanism according to a third exemplary embodiment.
Figure 20:
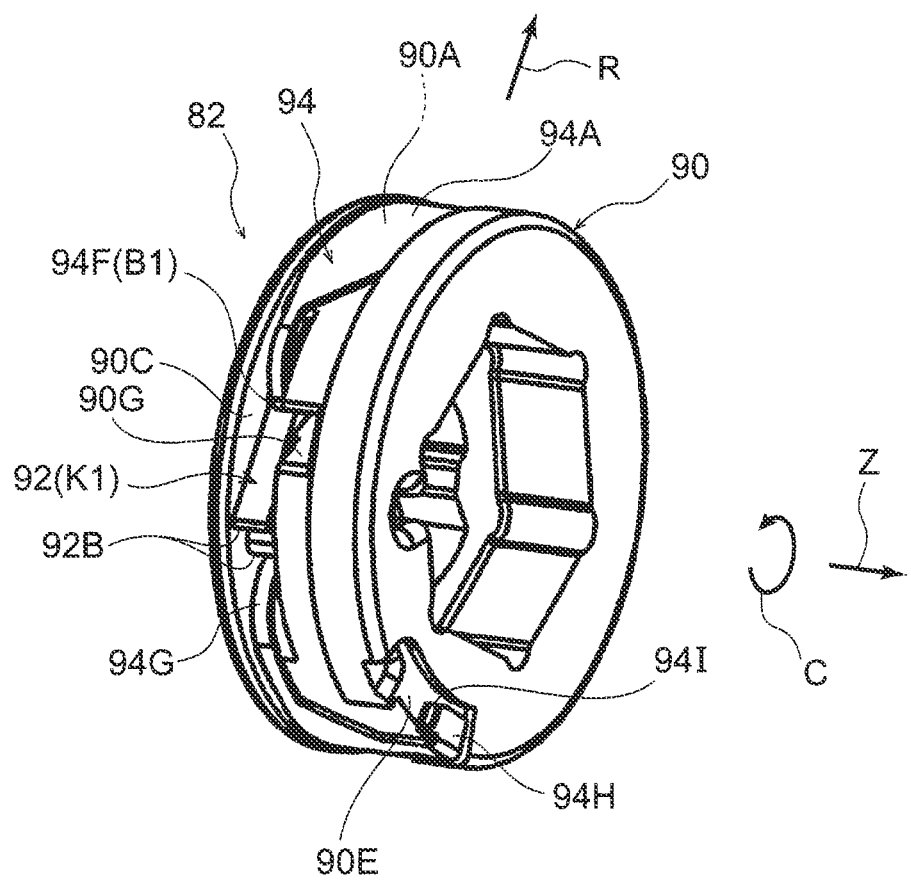
FIG. 20 is an enlarged perspective view illustrating a rotation force transmitting mechanism according to the third exemplary embodiment, illustrating a state in which a restricting portion of a trigger ring is disposed in a restricting position and a pawl is disposed in a housed position.

Explanation follows regarding a rotation force transmitting mechanism 82 according to a third exemplary embodiment, with reference to FIG. 19 to FIG. 21. Note that members and sections corresponding to the above exemplary embodiments are appended with the same reference numerals as those in the above exemplary embodiments, and explanation regarding these members and sections is sometimes omitted.

As illustrated in FIG. 19, in the rotation force transmitting mechanism 82 of the present embodiment, a restricting portion 94F formed in substantially an L shape is provided at the end portion 94D on the one side in the circumferential direction of the wound section 94A of the trigger ring 94, and a pawl abut portion 94G is provided at the end portion 94E on the another side in the circumferential direction of the wound section 94A. In the present embodiment, a restricting portion placement groove 90G, in which an end portion T2 on the one side in the axial direction of the restricting portion 94F of the trigger ring 94 is disposed, is integrally formed in the pawl housing hole 90C. As illustrated in FIG. 20, the restricting portion 94F of the trigger ring 94 abuts the radial direction outside face (the face where the raised portion 92C (see FIG. 13) is formed) of the pawl 92, such that tilting (swinging) of the pawl 92 is restricted.

As illustrated in FIG. 21, when the spool 14 is rotated in the pull-out direction with respect to the trigger ring 94, a portion (the end portion T2 on the one side in the axial direction) of the restricting portion 94F of the trigger ring 94, that is stopped at the restricting portion placement groove 90G, is deformed, and a state arises in which this portion does not abut the radial direction outside face of the pawl 92 (the restricting portion 94F of the trigger ring 94 is disposed in the permitting position B2). Then, the pawl 92 is tilted (swung) along the pawl abut portion 94G of the trigger ring 94, thereby enabling the pawl 92 to engage with the winding ring 48 (see FIG. 3).

In the above exemplary embodiments, an example has been explained configured such that rotation force of the spool 14 is transmitted to the winding ring 48 by actuating the rotation force transmitting mechanism 82; however, the present disclosure is not limited thereto. For example, configuration may be such that rotation force of the spool 14 is transmitted to the frame 12 by actuating the rotation force transmitting mechanism 82 when the spool 14 has rotated a specific number of times with respect to the base lock 30. In such a configuration, the pawl 92 engages with the frame 12 when the spool 14 has rotated the specific number of times with respect to the base lock 30. This enables rotation of the spool 14 in the pull-out direction to be limited.

In the above exemplary embodiments, an example has been explained in which the trigger ring 94 is formed using a single plate shaped member; however, the present disclosure is not limited thereto. For example, the trigger ring 94 may each be formed using a wire shaped member.

As illustrated in FIG. 5 to FIG. 7, in the above exemplary embodiments, an example has been explained configured such that switching, between whether or not the energy absorbing wire 50 is deformed between the movement portion 54C of the lever 54 and the wire guide 52, is performed by providing the cam turning mechanism 58; however, the present disclosure is not limited thereto. For example, configuration may be such that an actuator actuated when the webbing 100 is worn by an occupant with a large build is provided, and the movement portion 54C of the lever 54 moves toward the wire guide 52 side when the actuator is actuated.

Exemplary embodiments have been explained above. However, it is not limited to the above description, and obviously various other modifications may be implemented within a scope not departing from the spirit of the present invention.

What is claimed is:
1. A webbing take-up device comprising:
a spool that takes up a webbing worn by an occupant, and that is rotated in a pull-out direction due to the webbing being pulled out;
a lock section that is configured to rotate integrally with the spool, and that is restricted from rotating in the pull-out direction in a vehicle emergency so as to limit rotation of the spool in the pull-out direction, with respect to the lock section;
a pawl that is rotated together with the spool and that, by being displaced to an engaged position, engages with a rotation force transmitting member so as to transmit rotation force of the spool to the rotation force transmitting member; and a pawl displacement member that is configured to be displaced in a rotation circumferential direction of the spool, with respect to the spool, and that includes a pawl-abut portion, the pawl-abut portion abutting the pawl and displacing the pawl to the engaged position in a case in which the spool is rotated in the pull-out direction, with respect to the lock section, wherein the pawl displacement member is configured including a stop portion that restricts displacement of the pawl displacement member in the rotation circumferential direction of the spool, with respect to the lock section, by being stopped at a stopping portion formed at the lock section.

2. The webbing take-up device of claim 1, wherein the pawl-abut portion is configured to deform toward a side opposite to the pawl and is configured to return toward a side of the pawl from a deformed state of the pawl-abut portion.

3. The webbing take-up device of claim 2, wherein:

the pawl displacement member is configured including a wound section that is attached to a ring shaped pawl displacement member winding section provided at the spool, the wound section being formed in a ring shape corresponding to the pawl displacement member winding section, and the wound section being formed in a plate shape with a thickness direction thereof being a rotation radial direction of the spool.

4. The webbing take-up device of claim 3, wherein:

a first end portion on a pull-out direction side of the wound section and a second end portion on an opposite side to the pull-out direction side of the wound section overlap with each other; and the second end portion is disposed further toward an outer side in the rotation radial direction of the spool than the first end portion.

5. The webbing take-up device of claim 1, wherein:

the pawl displacement member is configured including a facing portion, the facing portion being restricted from moving in a rotation axis direction of the spool by being disposed between the lock section and the spool; and the stop portion extends from the facing portion.

6. The webbing take-up device of claim 5, wherein:

the pawl-abut portion restricts displacement of the pawl displacement member, with respect to the spool, by being abutted by an abutting portion provided at the spool in a case in which the pawl is disposed in the engaged position; and after the pawl-abut portion is abutted by the abutting portion, the stop portion comes away from the stopping portion in a case in which the spool is rotated in the pull-out direction, with respect to the lock section.

7. The webbing take-up device of claim 1, wherein:

the pawl displacement member is configured including a wound section that is attached to a ring shaped pawl displacement member winding section provided at the spool, the wound section being formed in a ring shape corresponding to the pawl displacement member winding section, and the wound section being formed in a plate shape with a thickness direction thereof being a rotation radial direction of the spool.

8. The webbing take-up device of claim 7, wherein:

a first end portion on a pull-out direction side of the wound section and a second end portion on an opposite side to the pull-out direction side of the wound section overlap with each other; and the second end portion is disposed further toward an outer side in the rotation radial direction of the spool than the first end portion.

9. The webbing take-up device of claim 8, wherein:

the wound section is disposed at an inner side in the rotation radial direction of the spool, with respect to the rotation force transmitting member that has an inner peripheral portion formed in a ring shape; and a length from one side end in the rotation circumferential direction of the spool to another side end in the rotation circumferential direction of the spool of the wound section is longer than an inner peripheral length in the rotation circumferential direction of the spool of the rotation force transmitting member.

10. The webbing take-up device of claim 8, wherein:

the pawl is disposed at an inner side in the rotation radial direction of the spool, with respect to the wound section; and the pawl-abut portion extends from the wound section toward the inner side in the rotation radial direction of the spool.

11. The webbing take-up device of claim 7, wherein:

the wound section is disposed at an inner side in the rotation radial direction of the spool, with respect to the rotation force transmitting member that has an inner peripheral portion formed in a ring shape; and a length from one side end in the rotation circumferential direction of the spool to another side end in the rotation circumferential direction of the spool of the wound section is longer than an inner peripheral length in the rotation circumferential direction of the spool of the rotation force transmitting member.

12. The webbing take-up device of claim 7, wherein:

the pawl is disposed at an inner side in the rotation radial direction of the spool, with respect to the wound section; and the pawl-abut portion extends from the wound section toward the inner side in the rotation radial direction of the spool.

* * * * *